(12) United States Patent
Tanugula et al.

(10) Patent No.: US 12,708,490 B2
(45) Date of Patent: Aug. 18, 2026

(54) SYSTEMS AND METHODS FOR OCCLUSAL MANDIBULAR ADVANCEMENT BLOCK PLACEMENT

(71) Applicant: ALIGN TECHNOLOGY, INC., San Jose, CA (US)

(72) Inventors: Rohit Tanugula, San Jose, CA (US); James Nishimuta, Durham, NC (US); Nilesh Joshi, Cary, NC (US); Thomas Jansen, Durham, NC (US); Anna Gorelova, Moscow (RU); Ekaterina Menshova, Moscow (RU); Artem Trotsko, Moscow Odintsovo (RU); Andrey Prokopenko, Nizhny Novgorod (RU); Arina Yakshibaeva, Moscow (RU)

(73) Assignee: Align Technology, Inc., San Jose, CA (US)

( * ) Notice: Subject to any disclaimer, the term of this patent is extended or adjusted under 35 U.S.C. 154(b) by 223 days.

(21) Appl. No.: 18/360,125

(22) Filed: Jul. 27, 2023

(65) Prior Publication Data

US 2024/0033045 A1 Feb. 1, 2024

Related U.S. Application Data

(60) Provisional application No. 63/369,850, filed on Jul. 29, 2022.

(51) Int. Cl.
*A61C 7/08* (2006.01)
*A61C 7/00* (2006.01)

(52) U.S. Cl.
CPC ................ *A61C 7/08* (2013.01); *A61C 7/002* (2013.01)

(58) Field of Classification Search
CPC .............. A61C 7/08; A61C 7/002; A61C 7/36
See application file for complete search history.

(56) References Cited

U.S. PATENT DOCUMENTS 5,975,893 A 11/1999 Chishti et al.
6,227,850 B1 5/2001 Chishti et al.
6,227,851 B1 5/2001 Chishti et al.
6,299,440 B1 10/2001 Phan et al.
(Continued)

FOREIGN PATENT DOCUMENTS

CN 112739287 * 10/2022
EP 3383310 B1 3/2022

OTHER PUBLICATIONS

CN112739287 (Year: 2022).*

*Primary Examiner* — Amy R Weisberg
(74) *Attorney, Agent, or Firm* — FisherBroyles, LLP

(57) ABSTRACT

A method of treating malocclusions of teeth may include receiving a scan of a patient's teeth and generating a treatment plan to move a patient's teeth from a first position toward a second position. The treatment plan may include moving a jaw from a first position towards a second position. The treatment plan may include a series of jaw movement stages to move the jaw from the first position towards the second position. The method may include generating a digital model of an aligner having mandibular relocation structures. A location of the mandibular relocation structures may be based on a set of location constraints. The method may include fabricating a physical aligner based on the digital model of the aligner.

20 Claims, 29 Drawing Sheets

(56) References Cited

U.S. PATENT DOCUMENTS 6,309,215 B1 10/2001 Phan et al.
6,318,994 B1 11/2001 Chishti et al.
6,371,761 B1 4/2002 Cheang et al.
6,386,878 B1 5/2002 Pavlovskaia et al.
6,406,292 B1 6/2002 Chishti et al.
6,409,504 B1 6/2002 Jones et al.
6,450,807 B1 9/2002 Chishti et al.
6,457,972 B1 10/2002 Chishti et al.
6,488,499 B1 12/2002 Miller
6,514,074 B1 2/2003 Chishti et al.
6,554,611 B2 4/2003 Chishti et al.
6,582,229 B1 6/2003 Miller et al.
6,602,070 B2 8/2003 Miller et al.
6,621,491 B1 9/2003 Baumrind et al.
6,688,886 B2 2/2004 Hughes et al.
6,726,478 B1 4/2004 Isiderio et al.
6,729,876 B2 5/2004 Chishti et al.
6,739,869 B1 5/2004 Taub et al.
6,767,208 B2 7/2004 Kaza
6,783,360 B2 8/2004 Chishti
6,830,450 B2 12/2004 Knopp et al.
7,040,896 B2 5/2006 Pavlovskaia et al.
7,063,532 B1 6/2006 Jones et al.
7,074,038 B1 7/2006 Miller
7,074,039 B2 7/2006 Kopelman et al.
7,077,647 B2 7/2006 Choi et al.
7,108,508 B2 9/2006 Hedge et al.
7,134,874 B2 11/2006 Chishti et al.
7,156,661 B2 1/2007 Choi et al.
7,160,107 B2 1/2007 Kopelman et al.
7,241,142 B2 7/2007 Abolfathi et al.
7,293,988 B2 11/2007 Wen
7,309,230 B2 12/2007 Wen
7,357,634 B2 4/2008 Knopp
7,555,403 B2 6/2009 Kopelman et al.
7,637,740 B2 12/2009 Knopp
7,689,398 B2 3/2010 Cheng et al.
7,736,147 B2 6/2010 Kaza et al.
7,746,339 B2 6/2010 Matov et al.
7,844,356 B2 11/2010 Matov et al.
7,844,429 B2 11/2010 Matov et al.
7,865,259 B2 1/2011 Kuo et al.
7,878,804 B2 2/2011 Korytov et al.
7,880,751 B2 2/2011 Kuo et al.
7,904,308 B2 3/2011 Arnone et al.
7,930,189 B2 4/2011 Kuo
7,942,672 B2 5/2011 Kuo
7,970,627 B2 6/2011 Kuo et al.
7,970,628 B2 6/2011 Kuo et al.
8,038,444 B2 10/2011 Kitching et al.
8,044,954 B2 10/2011 Kitching et al.
8,075,306 B2 12/2011 Kitching et al.
8,092,215 B2 1/2012 Stone-Collonge et al.
8,099,268 B2 1/2012 Kitching et al.
8,108,189 B2 1/2012 Chelnokov et al.
8,126,726 B2 2/2012 Matov et al.
8,260,591 B2 9/2012 Kass et al.
8,275,180 B2 9/2012 Kuo
8,401,826 B2 3/2013 Cheng et al.
8,439,672 B2 5/2013 Matov et al.
8,562,338 B2 10/2013 Kitching et al.
8,591,225 B2 11/2013 Wu et al.
8,788,285 B2 7/2014 Kuo
8,843,381 B2 9/2014 Kuo et al.
8,874,452 B2 10/2014 Kuo
8,896,592 B2 11/2014 Boltunov et al.
8,930,219 B2 1/2015 Trosien et al.
9,037,439 B2 5/2015 Kuo et al.
9,060,829 B2 6/2015 Sterental et al.
9,125,709 B2 9/2015 Matty
9,211,166 B2 12/2015 Kuo et al.
9,220,580 B2 12/2015 Borovinskih et al.
9,364,296 B2 6/2016 Kuo
9,375,300 B2 6/2016 Matov et al.
9,414,897 B2 8/2016 Wu et al.
9,492,245 B2 11/2016 Sherwood et al.
9,642,678 B2 5/2017 Kuo
9,820,882 B2* 11/2017 Liptak .................... A61C 7/08
9,844,424 B2* 12/2017 Wu ........................ A61C 7/002
10,248,883 B2 4/2019 Borovinskih et al.
10,342,638 B2 7/2019 Kitching et al.
10,463,452 B2 11/2019 Matov et al.
10,537,406 B2* 1/2020 Wu ........................ A61C 7/08
10,595,966 B2 3/2020 Carrier, Jr. et al.
10,617,489 B2 4/2020 Grove et al.
10,722,328 B2 7/2020 Velazquez et al.
10,758,322 B2 9/2020 Pokotilov et al.
10,779,718 B2 9/2020 Meyer et al.
10,792,127 B2 10/2020 Kopelman et al.
10,828,130 B2 11/2020 Pokotilov et al.
10,835,349 B2 11/2020 Cramer et al.
10,973,611 B2 4/2021 Pokotilov et al.
10,996,813 B2 5/2021 Makarenkova et al.
10,997,727 B2 5/2021 Xue et al.
11,020,205 B2 6/2021 Li et al.
11,020,206 B2 6/2021 Shi et al.
11,026,766 B2 6/2021 Chekh et al.
11,033,359 B2 6/2021 Velazquez et al.
11,071,608 B2 7/2021 Derakhshan et al.
11,096,763 B2 8/2021 Akopov et al.
11,116,605 B2 9/2021 Nyukhtikov et al.
11,147,652 B2 10/2021 Mason et al.
11,151,753 B2 10/2021 Gao et al.
11,154,381 B2 10/2021 Roschin et al.
11,259,896 B2 3/2022 Matov et al.
11,357,598 B2 6/2022 Cramer
11,395,717 B2 7/2022 Yuryev et al.
11,432,908 B2 9/2022 Kopelman et al.
11,464,604 B2 10/2022 Makarenkova et al.
11,478,334 B2 10/2022 Matov et al.
11,484,389 B2 11/2022 Sterental et al.
11,521,732 B2 12/2022 Levin et al.
11,534,272 B2 12/2022 Li et al.
11,553,988 B2 1/2023 Mednikov et al.
11,633,268 B2 4/2023 Moalem et al.
11,642,195 B2 5/2023 Gao et al.
11,651,494 B2 5/2023 Brown et al.
11,654,001 B2 5/2023 Roschin et al.
11,707,344 B2 7/2023 Roschin et al.
11,810,271 B2 11/2023 Shi et al.
11,850,111 B2 12/2023 Derakhshan et al.
2003/0008259 A1 1/2003 Kuo et al.
2003/0143509 A1 7/2003 Kopelman et al.
2003/0207227 A1 11/2003 Abolfathi
2004/0137400 A1 7/2004 Chishti et al.
2004/0152036 A1 8/2004 Abolfathi
2004/0197728 A1 10/2004 Abolfathi et al.
2004/0259049 A1 12/2004 Kopelman et al.
2005/0182654 A1 8/2005 Abolfathi et al.
2005/0244791 A1 11/2005 Davis et al.
2006/0127836 A1 6/2006 Wen
2006/0127852 A1 6/2006 Wen
2006/0127854 A1 6/2006 Wen
2006/0275731 A1 12/2006 Wen et al.
2006/0275736 A1 12/2006 Wen et al.
2008/0306724 A1 12/2008 Kitching et al.
2010/0009308 A1 1/2010 Wen et al.
2010/0068672 A1 3/2010 Arjomand et al.
2010/0068676 A1 3/2010 Mason et al.
2010/0092907 A1 4/2010 Knopp
2010/0167243 A1 7/2010 Spiridonov et al.
2013/0204599 A1 8/2013 Matov et al.
2015/0238284 A1* 8/2015 Wu ........................ A61C 7/002 703/1
2016/0199216 A1* 7/2016 Cam ...................... A61F 5/566 128/848
2016/0228286 A1* 8/2016 Rayek .................... A61C 7/08
2017/0273760 A1 9/2017 Morton et al.
2018/0280118 A1 10/2018 Cramer
2019/0147666 A1* 5/2019 Keustermans .......... G06T 19/20 433/213
2019/0328487 A1 10/2019 Levin et al.
2019/0328488 A1 10/2019 Levin et al.
2020/0155274 A1 5/2020 Pimenov et al.

(56) References Cited

U.S. PATENT DOCUMENTS

| | | | |
|---|---|---|---|
| 2020/0297458 | A1 | 9/2020 | Roschin et al. |
| 2020/0306011 | A1 | 10/2020 | Chekhonin et al. |
| 2021/0134436 | A1 | 5/2021 | Meyer et al. |

* cited by examiner 720
5
4
3
2
716
712
730
5
4
2
718
712
710
5
4
3
2
714
712

1510
1522
1512
1530
1520
1524
1514
lingual side
buccal side

SYSTEMS AND METHODS FOR OCCLUSAL MANDIBULAR ADVANCEMENT BLOCK PLACEMENT

RELATED APPLICATIONS

This application claims the benefit under 35 U.S.C. § 119(e) of U.S. Provisional Patent Application No. 63/369,850, filed Jul. 29, 2022, and titled "SYSTEMS AND METHODS FOR OCCLUSAL MANDIBULAR ADVANCEMENT BLOCK PLACEMENT," which is incorporated, in its entirety, by this reference.

BACKGROUND

Oral appliances, such as aligners, may be used for various treatments of a patient's dentition, such as orthodontic treatments. For example, aligners are often used for moving teeth into correct placement. Oral appliances may also be used for mandibular relocation (MR) treatment, such as mandibular advancement, by gradually relocating a patient's mandible into correct placement. In some instances, the teeth of the patient's upper and lower jaws may contact in an incorrect or sub-optimal manner, e.g. crowding, crossbite or deep bite. A proper fit of the occlusal surfaces of the teeth is helpful for chewing as well as aesthetic appearances. The proper fit can be related to the relative positions of the mandible and maxilla, either of which may be retruded or protruded relative to the ideal position. The mandibular relocation treatment can be used to change the relative position of the upper and lower jaws toward a more optimal alignment. The relocation treatment may utilize occlusal blocks on oral appliances. The occlusal blocks may be protrusions extending from occlusal surfaces of aligners. Contact between corresponding pairs of occlusal blocks, such as between corresponding occlusal blocks from upper and lower aligners, may apply force to gradually relocate the patient's mandible.

The oral appliances may be used exclusively for mandibular relocation treatment or used for simultaneous treatment, such as mandibular relocation treatment with teeth alignment treatment. Teeth alignment treatment may involve various stages. Each stage may involve an aligner worn by the patient for several weeks and designed to incrementally shift teeth compared to a prior stage. Mandibular relocation treatment may be more gradual and may require longer treatment. For instance, mandibular relocation treatment often relies on several tracks of treatment, each track including a series of mandibular relocation stages.

The placement of occlusal blocks for each stage of each track may be selected to advance the patient's mandible. Determining viable locations for the occlusal blocks may be a resource-intensive process. Determining a location is a time-consuming process that often results in less than desirable occlusal block locations that are realized only after or during treatment and wearing of an appliance. Work in relation to the present disclosure suggests that it may be desirable to iteratively compute potential occlusal block locations based on a series of constraints. For example, certain locations may be unfeasible due to structural weaknesses, manufacturing constraints, material limitations, etc. Other constraints may include human constraints, such as limitations due to the patient's oral structure or facial structure, incompatibility with other orthodontic treatments, etc.

The present disclosure, therefore, identifies and addresses a need for systems and methods for selecting locations of occlusal blocks on oral appliances which may reliably advance a patient's mandibula while being comfortable for a patient to wear for long periods of time.

SUMMARY

As will be described in greater detail below, the present disclosure describes various systems and methods for selecting locations of occlusal blocks on oral appliances. Locations for placing a occlusal blocks for mandibular relocation (MR) treatment may be determined by evaluating the candidate locations for satisfying a series of constraints. The systems and methods described herein may improve occlusal block location selection when compared to conventional approaches which may merely select the first available candidate location for each stage.

In addition, the systems and methods described herein may improve the functioning of a computing device by selectively targeting locations for placing occlusal blocks on aligners, thereby improving processing efficiency of the computing device over conventional approaches. These systems and methods may also improve the field of orthodontic treatment by selecting occlusal block locations that may improve patient comfort and effectiveness of the mandibular relocation treatment.

INCORPORATION BY REFERENCE

All patents, applications, and publications referred to and identified herein are hereby incorporated by reference in their entirety, and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

The following detailed description provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

Although reference is made to thermoforming appliances with occlusal blocks, the appliances and occlusal blocks can be manufactured together, for example with additive manufacturing such as 3D printing in order to manufacture the appliance with occlusal blocks in accordance with a treatment plan.

Figure 1:
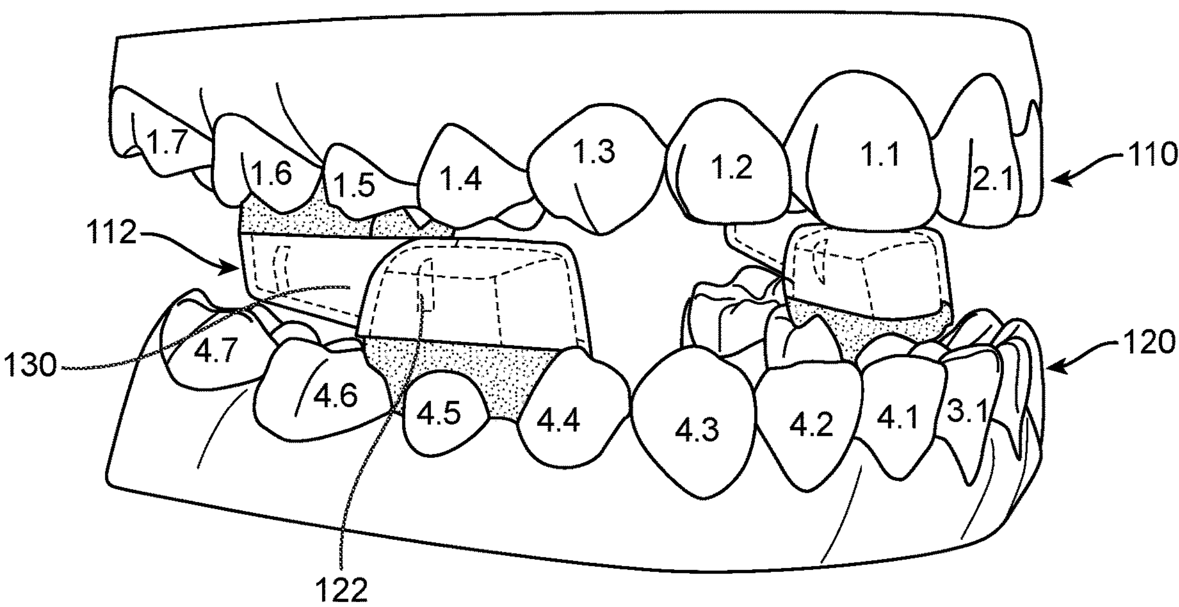
FIG. 1 shows an example of a placement of occlusal blocks for an oral appliance, in accordance with some embodiments.

FIG. 1 illustrates a features of an oral appliance which may be used for mandibular relocation treatment. An oral appliance may include an upper shell for an upper jaw 110, which may have one or more teeth-receiving cavities for receiving teeth of an upper jaw, and a lower shell for a lower jaw or mandible 120, which may have one or more teeth-receiving cavities for receiving teeth of a lower jaw. The upper shell may include an upper mandibular relocation feature, such as occlusal block 112, which may comprise a protrusion extending downwards (e.g. toward the lower jaw). The lower shell may include a lower mandibular relocation feature, such as occlusal block 122, which may comprise a protrusion extending upwards (e.g., toward the upper jaw). The upper mandibular relocation feature 112 may engage lower mandibular relocation feature 122 along an engagement region 130 when the oral appliance is worn by a patient and the upper shell and the lower shell are brought together (e.g., when the patient closes his or her mouth). This engagement may produce an anterior force that may displace lower shell anteriorly relative to upper shell, which may push the patient's mandible in an anterior direction.

Although mandibular upper relocation feature 112 and lower mandibular relocation feature 122 are shown as located on the buccal surfaces, in some embodiments, upper mandibular relocation feature 112 and/or lower mandibular relocation feature 122 may be located on other surfaces, such as on the lingual surfaces or occlusal surfaces. In addition, although FIG. 1 depicts a two pairs of mandibular relocation features, oral appliance 100 may include more or fewer pairs of mandibular relocation features. Moreover, the shapes of upper mandibular relocation feature 112 and/or lower mandibular relocation feature 122 may vary, for instance having complementary shapes for mating in order to improve the stability of engagement region 130.

The upper mandibular relocation feature 112 and the lower mandibular relocation feature 122 may comprise one or more structures suitable for mandibular relocation, such as rigid precision wings, curved precision wings or mandibular advancement blocks, and combinations thereof. In some embodiments, the precision wings comprising wing like structures, e.g. protrusions, extending to one or more sides of the appliance to engage each other and generate the mandibular relocation forces at engagement region 130. The protrusions of the precision wings may comprise complimentary curved engagement surfaces, or substantially flat inclined engagement surfaces, that engage each other to generate the mandibular relocation forces. The protrusions of the precision wings may comprise stiff structures, for example rigid structures, in order to transmit the mandibular relocation forces to the appliance. The occlusal blocks may comprise protrusions extending between occlusal surfaces of the appliances, which comprise surfaces sized and shaped to engage each other to generate the mandibular relocation forces with engagement region 130 located between the upper and lower jaw. The upper mandibular relocation feature 112 and the lower mandibular relocation feature 122 may comprise any suitable combination of these structures in order to generate the MR forces at the engagement region 130.

An upper shell and/or lower shell may each comprise a polymeric shell appliance having a thickness suitable for mandibular relocation treatment. In some embodiments the polymeric shell thickness may be no more than about 2 millimeters, and, in some embodiments, the polymeric shell's thickness may be within a range from about 0.2 millimeter to about 2 millimeters. The polymeric shell may comprise a plurality of layers, for example.

Many types of oral appliances, in addition to polymeric appliances, are suitable for use in accordance with the present disclosure. For example, an oral appliance may comprise a retainer, a palatal expander, a nightguard, an apnea appliance, or a functional appliance. The appliance and mandibular relocation features can be manufactured in many ways and may comprise a 3D printed aligner with mandibular relocation features, in which the aligner and mandibular relocation features have been 3D printed together, or an aligner formed on a 3D thermoforming mold with mandibular relocation features placed on the 3D thermoforming mold.

Figure 2A:
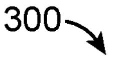
FIGS. 2A, 2B, and 2C show flow diagrams of example methods for selecting locations of occlusal blocks on oral appliances, in accordance with some embodiments.
Figure 2A:
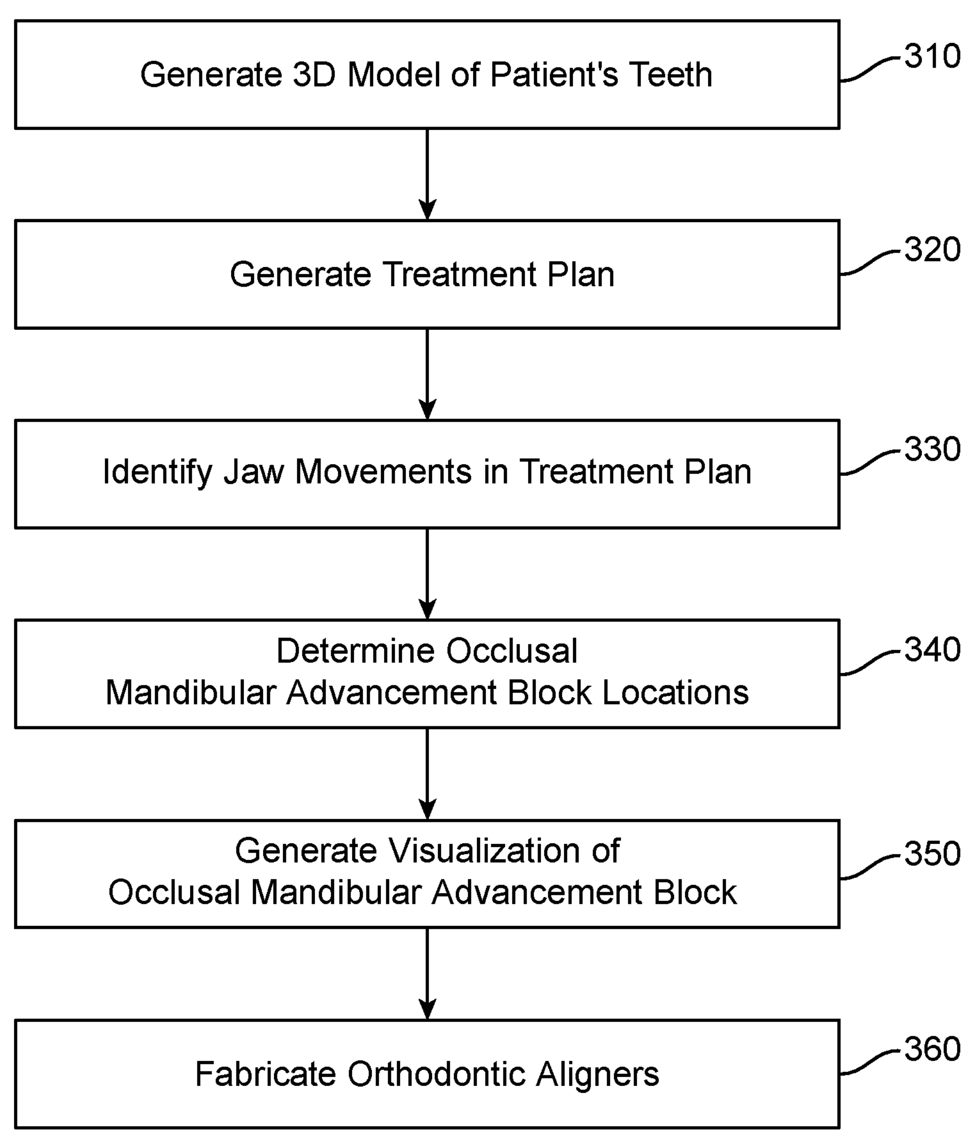

FIG. 2A shows an example method 300 for orthodontic treatment, including mandibular relocation. The method 300 many include generating a model of a patient's teeth at block 310, generating a treatment plan for relocating the patient's mandible and/or teeth at block 330, identifying jaw movements in the treatment plan at block 330, determining occlusal mandibular advancement block locations at block 340, generating a visualization of mandibular relocation features at block 350, and fabricating orthodontic aligners at block 360. The method 300 is described in more detail below.

Figure 20:
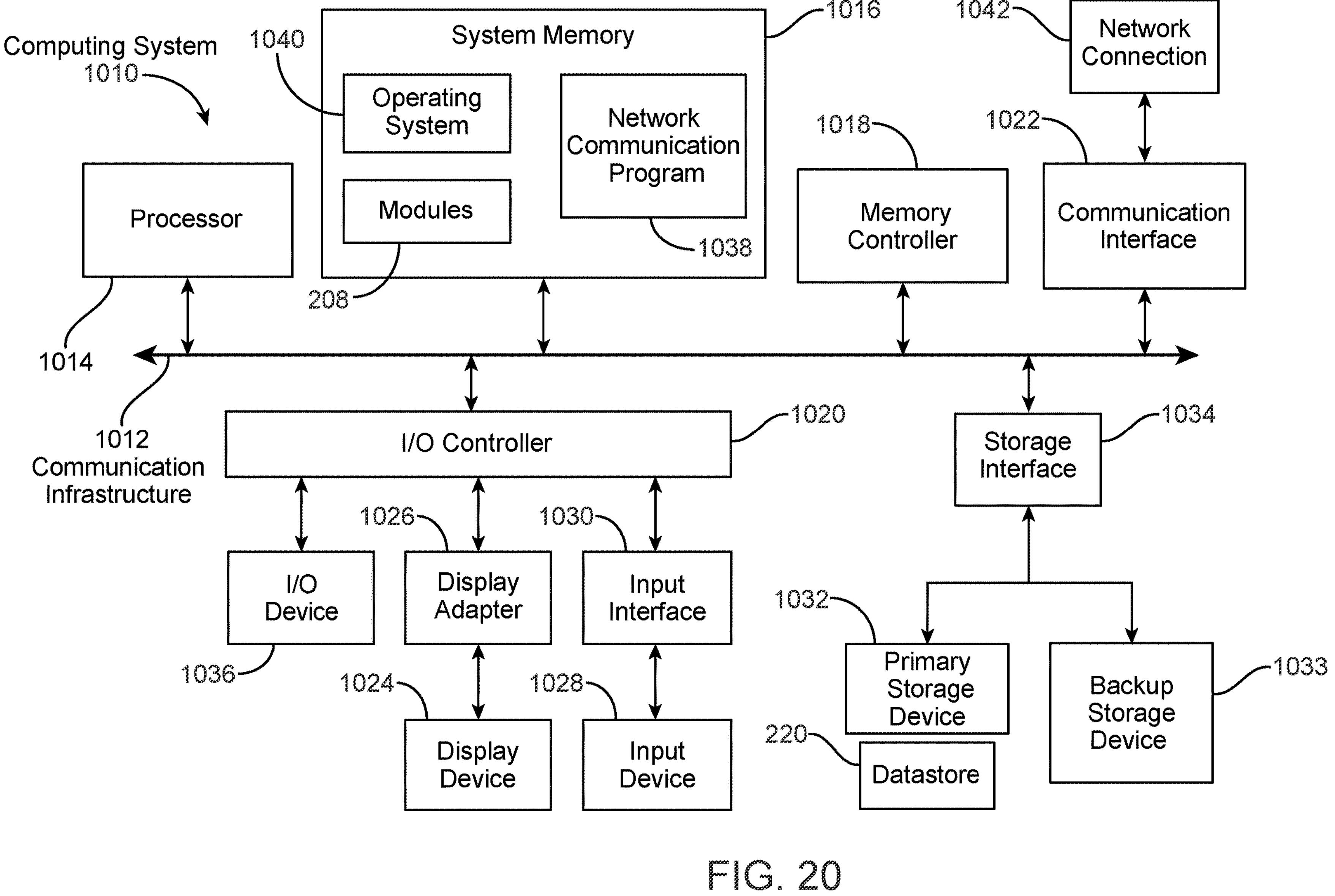
FIG. 20 shows a block diagram of an example computing system capable of implementing one or more embodiments described and/or illustrated herein, in accordance with some embodiments.
Figure 21:
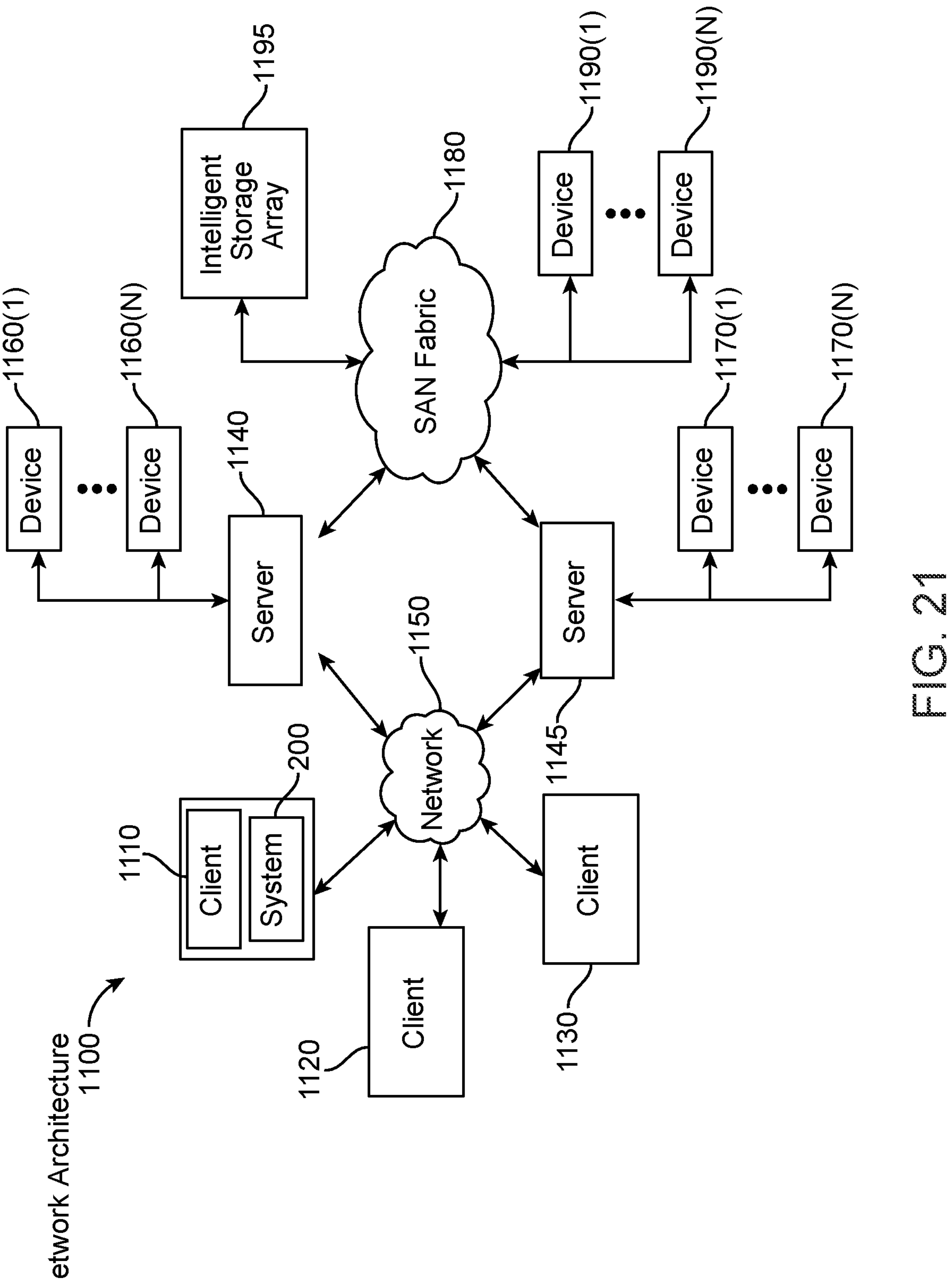
FIG. 21 shows a block diagram of an example computing network capable of implementing one or more of the embodiments described and/or illustrated herein, in accordance with some embodiments.

The process shown in FIG. 2A may be performed by any suitable computer-executable code and/or computing system, including the system(s) illustrated in FIGS. 20, and 21. In one example, each of the steps of the process 300 shown in FIG. 2A may represent an algorithm whose structure includes and/or is represented by multiple sub-steps, examples of which will be provided in greater detail below.

The method 300 may start at block 310 by generating a 3D model of a patient's teeth. A scanner, such as an intraoral scanner, may be used to generate scan data by scanning the patient's dentition. During the scanning process, individual frames or images of the patient's teeth may be used to generate the 3D model of the teeth of the patient. The 3D model of the teeth of the patient may include 3D data representing the surface contours and shape of the patient's dentition, including teeth and gingiva, along with color data representing the color of the patient's anatomy associated with the surface of the patient's teeth, gums, and other oral anatomy. The scan data may be stitched together to generate a 3D model of the patient's dentition, such as the upper j aw and lower jaws of the patient individually and in occlusion. The 3D model of the patient's dentition may include lingual, buccal, and occlusal surfaces of the patient's teeth along with buccal and lingual surfaces of the patient's gingiva. The scan data may include digital representations of a patient's teeth. The digital representation, such as the two-dimensional or three-dimensional models may include surface topography data for the patient's intraoral cavity (including teeth, gingival tissues, etc.). The surface topography data can be generated by directly scanning the intraoral cavity, using a suitable scanning device (e.g., a handheld scanner).

At block 320 a treatment plan for treating the patient's teeth is generated. The treatment plan may be a dental treatment plan, such as an orthodontic treatment plan that moves a patient's teeth from a first arrangement towards a second arrangement. The treatment plan may also include mandibular relocation. A treatment plan may move the patient's teeth and/or mandibula from the first position towards a second position in a serios of stages or steps. During treatment a first orthodontic appliance is applied to a patient's teeth in order to reposition the teeth from a first tooth arrangement towards a second tooth arrangement. Then, a second orthodontic appliance is applied to the patient's teeth in order to reposition the teeth from the second tooth arrangement to a third tooth arrangement. New appliances may be worn as necessary using any suitable number and combination of sequential appliances in order to incrementally reposition the patient's teeth from an initial arrangement towards a target arrangement. The appliances can be generated all at the same stage or in sets or batches (e.g., at the beginning of a stage of the treatment), or one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality.

After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

One or more treatment stages are generated based on the digital representation of the teeth, such as the 3D model. The treatment stages can be incremental repositioning stages of a dental treatment procedure designed to move one or more of the patient's teeth or mandible from an initial tooth arrangement to a target arrangement. For example, the treatment stages can be generated by determining the initial tooth arrangement and/or or mandible position indicated by the digital representation, determining a target tooth arrangement and/or mandible position, and determining movement paths of one or more teeth in the initial arrangement necessary to achieve the target tooth arrangement and/or and amount of mandible movement. The movement path can be optimized based on minimizing the total distance moved, preventing collisions between teeth, avoiding tooth movements that are more difficult to achieve, or any other suitable criteria.

At block 330, the jaw movements are determined based on the treatment plan. The treatment plan may be received and the jaw movements, such as the mandibular relocation movements for each stage of the treatment plan may be determined based on the treatment plan. In some embodiments, the jaw movements may be extracted from the treatment plan data.

At block 340, the locations for the mandibular relocation features, such as occlusal block, precision wings, and/or others, are determined based on satisfying one or more constraints. In some embodiments, the location may be based on an optimization of the constraints. The constraints include: jaw opening (FIG. 5), collision avoidance (FIG. 6), block orientation, including block inclination, angulation, and/or rotation (FIG. 7), the difference between a the block orientation and origin of two contacting blocks (FIG. 8), the distance and angle between blocks contact planes of two contacting blocks (FIG. 9), the proximity of the center of a block to the teeth centers (FIG. 10), the size of a gap between the occlusal surfaces of the teeth and an occlusal block (FIG. 11), the distal position of the block (FIG. 12), the arch position of the block (FIG. 13), the vertical engagement of the block pair (FIG. 14), the lateral engagement of the block pair (FIG. 15), the vertical asymmetry (FIG. 16), horizontal asymmetry (FIG. 17), and placement over a missing tooth (FIG. 18). Each constraint is discussed herein in more detail.

Figure 2B:
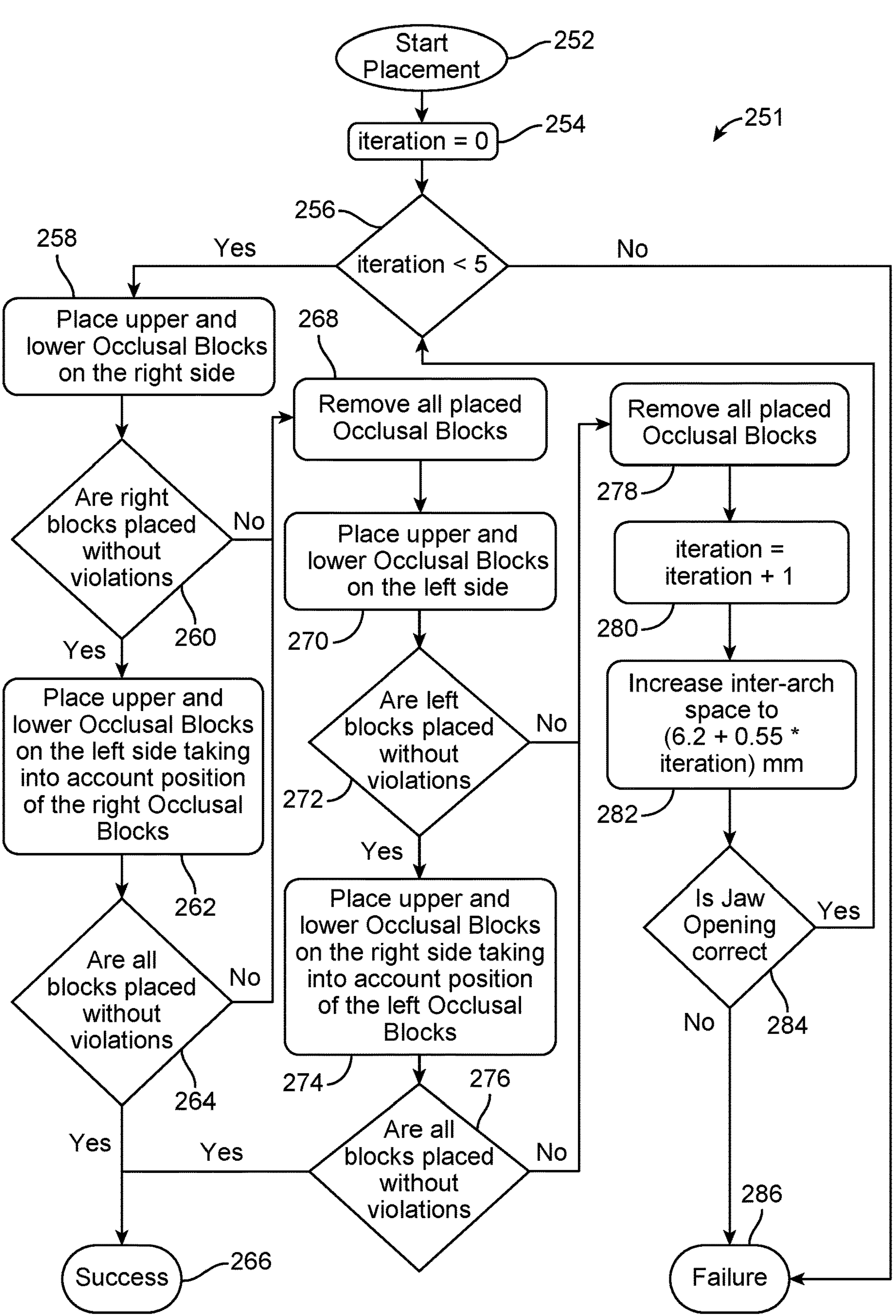

FIG. 2B shows an example method 251 for placing occlusal blocks for an orthodontic aligner that may take place at block 340. The method may start at block 252. At block 254, the value of the iterations is reset or set to zero. The process may then proceed to block 256 where the iteration value is checked. If the iteration value is less than 5, then the process proceeds to block 258. In some embodiments the initiation value may be checked to be less than a number other than 5, such as 3, 4, 6, 8, 10, or more. The iteration value may vary based on the how much the inter-arch distance increases with each iteration. Prior to proceeding to block 258, an initial value for the inter-arch distance may be set. The initial value may be between 1 mm and 8 mm, for example, 6.2 mm. In some embodiments, the inter-arch distance is set at the height of the occlusal blocks. In some embodiments, the inter-arch distance may be set to greater than the height of the occlusal blocks, such as 0.1 mm, 0.2 mm 0.3 mm, 0.4 mm, or 0.5 mm greater than the height of the occlusal blocks. In some embodiments, the initial inter-arch distance may be at least 0.1 mm, 0.2 mm 0.3 mm, 0.4 mm, or 0.5 mm greater than the height of the occlusal blocks. The inter-arch distance may be a displacement distance between the upper arch and the lower arch from a closed or occluded arch position.

At block 258 a pair of blocks are placed on the right side of the arch, one block on the lower arch and one of the upper arch. In some embodiments, the blocks may be placed on the left side at block 258. At block 260 the placement of the blocks is checked against the constraints, such as the constraints described herein. In some embodiments, only one-sided constraints are checked at block 260. If no constraints are violated, then the process proceeds to block 262.

At block 262 a pair of blocks are placed on the left side of the arch, one block on the lower arch and one of the upper arch. In some embodiments, the blocks may be placed on the right side at block 262. At block 264 the placement of the blocks is checked against the constraints, such as the constraints described herein. In some embodiments, one-sided and two-sided or symmetry constraints are checked at block 264. If no constraints are violated, then the process proceeds to block 266. At block 266, success is may be displayed or indicated or otherwise reported to a user.

If a constraint is violated or more than one constraint is violated at block 260 or 264, the process proceeds to block 268. At block 268 all the occlusal blocks are removed from the model. At block 270, a pair of blocks are placed on the opposite side of the arch as the blocks placed in block 258, such as the left side of the arch, one block on the lower arch and one of the upper arch. In some embodiments, the blocks may be placed on the right side at block 270. At block 272 the placement of the blocks is checked against the constraints, such as the constraints described herein. In some embodiments, only one-sided constraints are checked at block 272. If no constraints are violated, then the process proceeds to block 274.

At block 274 a pair of blocks are placed on the opposite side of the arch as the blocks placed at block 262, such as the right side of the arch, one block on the lower arch and one of the upper arch. In some embodiments, the blocks may be placed on the left side at block 274. At block 276 the placement of the blocks is checked against the constraints, such as the constraints described herein. If no constraints are violated, then the process proceeds to block 266. At block 266, success is may be displayed or indicated or otherwise reported to a user.

If a constraint is violated or more than one constraint is violated at block 272 or 276, the process proceeds to block 278. At block 268 all the occlusal blocks are removed from the model. At bock 280 the iteration value is increased by 1. After increasing the iteration value by 1, the inter-arch space may be increased. In some embodiments, the inter-arch space is increased by 0.55 mm. In some embodiments, the increased by 0.1 mm, 0.25 mm, or 0.75 mm per iteration. In some embodiments, the inter-arch distance may be increased by between 0.1 mm and 0.7 mm per iteration. In some embodiments, the inter-arch distance may be determined based on a formular, such as a starting inter-arch distance plus an increment about times the iteration. In some embodiments, the iteration may be incremented at block 280 after the inter-arch space is incremented.

At block 284 the jaw opening is checked to determine whether it matches the inter-arch space set at block 282. In some embodiments, at block 284, the jaw opening is checked to determine whether the jaw opening or inter-arch distance has exceeded a threshold, such as 10 mm. In some embodiments, the threshold may be greater or less than 10 mm, for example, smaller patients, such as children may have a lower threshold, such as 8 mm. If the jaw opening is not correct, then the process proceeds to block 286.

At block 286 a notification may be sent or displayed to a user indicating that occlusal blocks were not placed using the process. If the jaw opening is correct at block 284 the process proceeds to block 256 where the process either repeats itself, as described herein, or, if the iteration value is not less than 5, then the process proceeds to block 286 and block placement has failed.

At block 286 a notification may be sent or displayed to a user indicating that occlusal blocks were not placed using the process.

The optimization depicted in FIG. 2B may be run for each stage or jump of a mandibular relocation treatment. Each jump may reposition the mandible 1-4 mm and a total mandibular relocation treatment may move the mandible 5-15 mm. Each stage or jump of a mandibular relocation treatment may include one or more stages of an orthodontic treatment plan. For example, a first jump of mandibular replication may move the mandible forward 2 mm, but this movement may take 4-10 stages of the orthodontic treatment.

Figure 2C:
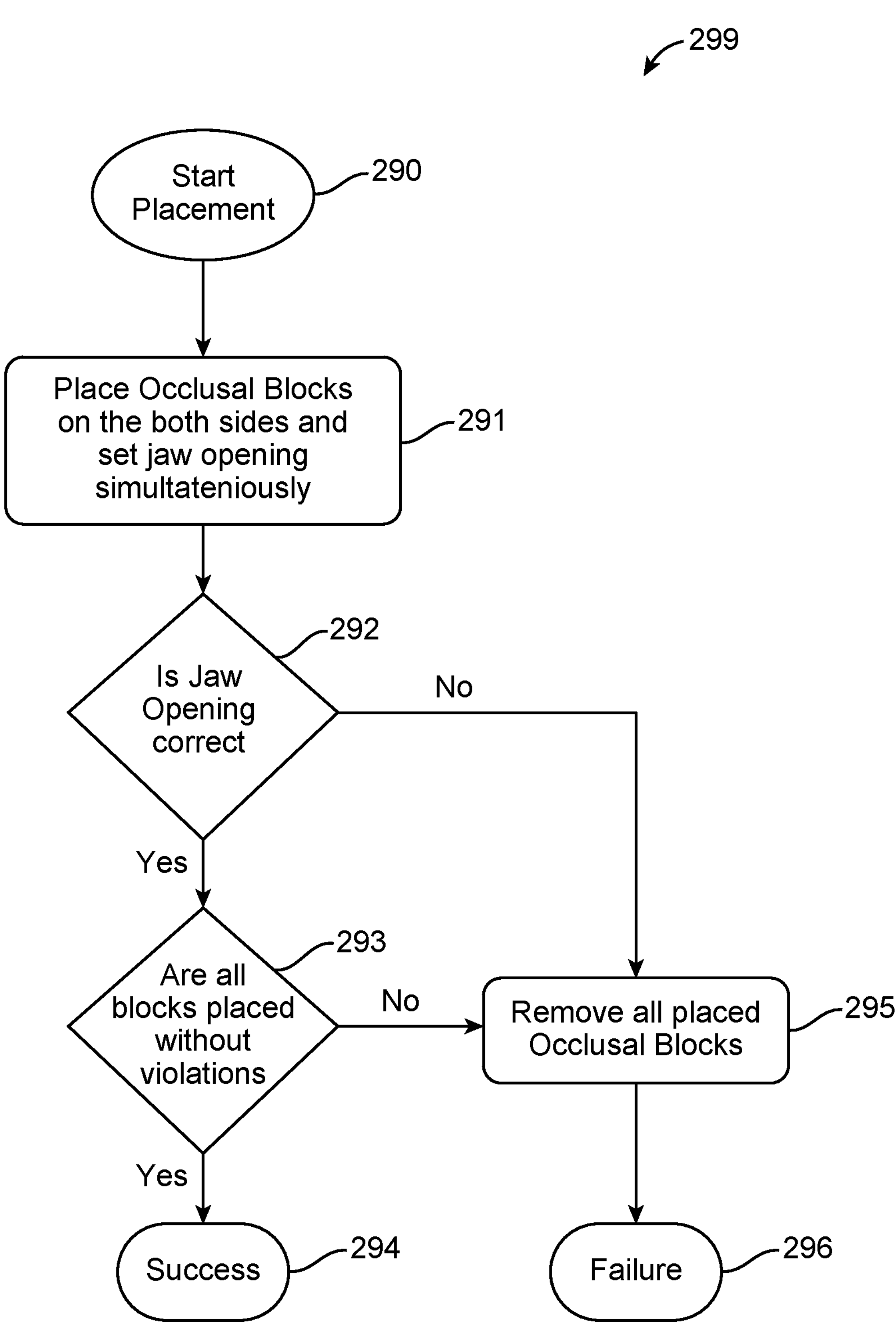

FIG. 2C shows an example method 299 for placing occlusal blocks on an orthodontic aligner. The method 299 for determined block placement may take place at block 340 and may start at block 290. At block 291 a first pair of blocks are placed on the right side of the arch and a second pair of blocks are placed on the left side of the arch and the jaw opening or inter-arch distance is set at an initial value. One block of each pair is placed on the lower arch and one of the upper arch.

At block 292 the jaw opening is checked to determine whether it matches the inter-arch space set at block 291. In some embodiments, at block 292, the jaw opening is checked to determine whether the jaw opening or inter-arch distance has exceeded a threshold, such as 10 mm. In some embodiments, the threshold may be greater or less than 10 mm, for example, smaller patients, such as children may have a lower threshold, such as 8 mm. If the jaw opening is not correct, then the process proceeds to block 293.

At block 293 the placement of the blocks is checked against the constraints, such as the constraints described herein, and variables are iterated on and constraints rechecked. Variables may include the jaw opening or inter-arch spacing, which may by changed between an upper bound of 10 mm and a lower bound of 1.2 mm. The constraints may include both one-sided constraints and two-sided or symmetry constraints, as described herein. In some embodiments, the location of the blocks may be determined based on an optimization of the constraints and variables.

If block 293 is successful and the blocks are placed while meeting the constraints and within an allowable range of the variables, then the process proceeds to block 294. At block 294, success is may be displayed or indicated or otherwise reported to a user.

If the jaw opening is not correct at block 292 or the blocks are not placed without violation at block 293, then the process may proceed to block 295. At block 295 all the occlusal blocks are removed from the model. After block 295 the process may proceed to block 295 wherein a notification may be sent or displayed to a user indicating that occlusal blocks were not placed using the process.

The optimization may be run for each stage or jump of a mandibular relocation treatment. Each jump may reposition the mandible 1-4 mm and a total mandibular relocation treatment may move the mandible 5-15 mm. Each stage or jump of a mandibular relocation treatment may include one or more stages of an orthodontic treatment plan. For example, a first jump of mandibular replication may move the mandible forward 2 mm, but this movement may take 4-10 stages of the orthodontic treatment.

Figure 5:
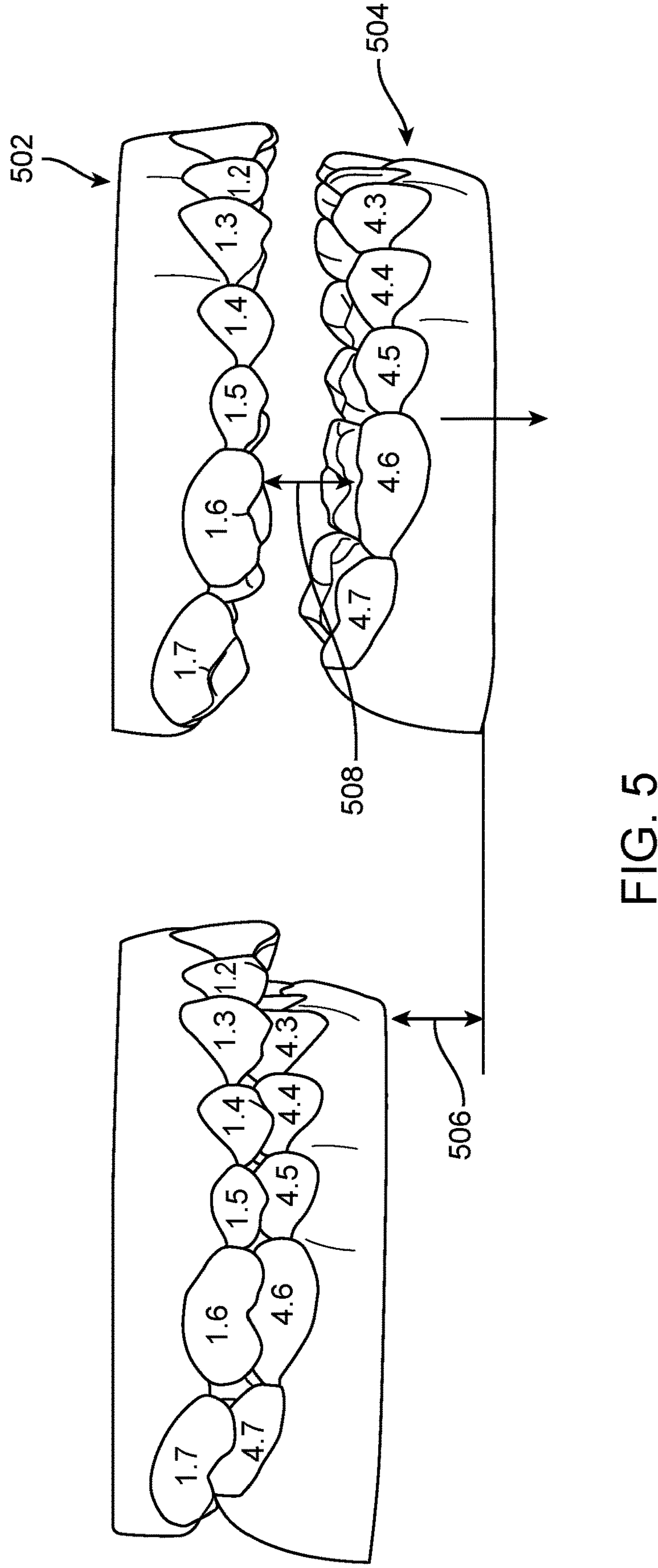
FIG. 5 shows an example of a jaw opening constraint for placing occlusal blocks on oral appliances, in accordance with some embodiments.

In some embodiments, the placement algorithm may begin by positioning the lower jaw to have a predefined distance between posterior teeth to fit occlusal blocks between the jaws. The opening distance may be set on the first and last stages of each jaw jump and on one or more intermediate stages of the jump. With reference to FIG. 5, the constraints on the jaw opening include that the minimum inter-arch distance 508 between three posterior teeth, including the two premolar and first molar, measured between the occlusal surfaces of the teeth of the lower and upper jaw, such as the most occlusal points on each jaw, should be between 6.2 mm and 6.75 mm, the maximum value of lower jaw vertical movement 506, measured as the displacement in the gingival-occlusal direction, may be lower than 10 mm, and the distance between anterior teeth (central and lateral incisors and canine teeth) of opposite jaws may be at least than 1.2 mm to account for aligner thickness plus additional separation to account for lagging intrusion of the teeth during treatment. For example, if the treatment plan includes intruding anterior teeth or intrusion of anterior teeth is identified in the treatment plan, then the additional amount of separation may be added. For example, half the amount of intrusion of an anterior tooth for a particular stage of treatment may be added to the jaw opening of that stage.

After determining the jaw opening, block positioning may begin by positioning two blocks on one side of the arches of the patient, such as the right side of the upper and lower arches on jaw jump interval on one side of the jaw in an initial starting position and orientation and then iterating through potential locations and orientations by solving for one or more the one-sided constraints discussed herein.

After the first part of blocks are placed, a second set of blocks are placed on the other side of the arch in an initial location and orientation and then then iterating through potential locations and orientations by solving for one or more the one-sided constraints discussed herein. In some embodiments, the positioning may include iterating through symmetry constraints that depend on the locations of the features on the opposite side of the arch.

In some embodiments, all four blocks may be placed and the one-sided and symmetry constraints applied to all four in the same iteration.

If placement fails, such is if the constraints are not satisfied, then the algorithm my begin again, but by placing the blocks on the opposite side of the arch first. For example, if in the first failed attempt the right side blocks were placed first and then the left side blocks were attempted to be placed, then in the second pass, the left side blocks are placed first and then the right side blocks are attempted to be placed.

If the placement fails again, then placement may be reattempted with an increased jaw opening distance. The jaw opening distance may be increased multiple times. For example, the jaw opening distance may be increased by 0.05 mm to 0.4 mm per iteration, such as 0.05 mm, 0.075 mm, 0.1 mm, 0.125 mm, 0.15 mm, 0.175 mm, 0.2 mm, 0.225 mm, 0.25 mm, 0.275 mm, 0.3 mm, 0.325 mm, 0.35 mm, 0.375 mm, or 0.4 mm. The total jaw opening may be increased by up to 2 mm over several iterations, such as up to 40 iterations.

Each positioning attempt may begin with the blocks positioned in most distal position and advanced mesially if placement fails.

In some embodiments, the constraints are applied for the first orthodontic stage of the jump and the last orthodontic stage of the jump. In some embodiments, one or more intermediate stages may also be evaluated.

The placement of the mandibular relocation features may use non-linear optimization algorithms. The algorithms may include one or a combination of interior point nonlinear methods, active set sequential linear-quadratic programming (SLQP) methods, sparse matrix storage methods, multistart methods and/or clustering methods.

In some embodiments, when the placement of the mandibular relocation features fails, the process may proceed back to block 320 wherein an updated treatment plan may be generated. For example, if the mandibular relocation features cannot be placed due to interference or proximity to an attachment placed according to the treatment plan, then at block 320 a revised treatment plan may be generated wherein an attachment location on a tooth is changed, such as moved more gingivally or removed. In some embodiments, tooth or jaw movements may be delayed in order to allow for mandibular relocation features placement. For example, a jaw movement may be delayed until after a tooth movement using an attachment is completed so that they attachment can be removed.

At block 350 a visualization of the mandibular relocation feature, such as an occlusal block, is generated. The visualization may include the location of the occlusal block with respect to each arch. In some embodiments, the occlusal block is generated along with the aligner in which it is located. The visualization may include a 2D or 3D view of the aligner with the occlusal blocks on the patient's teeth. In some embodiments, the visualizations may include generation of attachments placed on the patient's teeth and/or attachment receiving cavities on the aligner. In some embodiments, the visualization may include the upper and lower arches or jaws of the patient in occlusion.

Generating the visualization and providing or otherwise displaying the visualization for a dental professional, such as a dentist or orthodontist, allows the dental professional to approve, modify, or otherwise provide feedback on the block locations. In some embodiments, after receiving feedback, a constraint may be modified, and the optimization may be performed again. For example, a dental professional may reject a block location for one or more stages of treatment due to an unsatisfactory position with respect to one or more constraints, such as, for example, the gap between the occlusal surface of the tooth and the occlusal block. In such cases, the allowable range of the constraint, such as the maximum or minimum gap may be changed, and the optimization may be performed again for that the rejected stage or for all stages of treatment or all stages of treatment where the constraint is outside the modified an updated allowable range. In some embodiments, the weight of the constraint may be increased or decreased back on the feedback. Increasing the weight of the constraint may cause the optimization to prioritize the location of the block with respect to that constraint over other constraints.

At block 360, the orthodontic aligners with the occlusal block or other mandibular relocation features is fabricated. In some embodiments, instructions for fabrication the aligners based on the block locations and tooth positions for each stage of treatment may be generated. The instructions may be output for use by a fabrication machines to fabricate the applications. Appliances may be fabricated by the in output instructions.

At least one orthodontic appliance is fabricated based on the generated treatment stages and occlusal block positions. For example, a set of appliances can be fabricated to be sequentially worn by the patient to incrementally reposition the teeth and/or jaw from the initial arrangement and position to the target arrangement and position. Some of the appliances can be shaped to accommodate a tooth arrangement specified by one of the treatment stages.

An appliance or portion(s) thereof may be indirectly fabricated using a physical model of teeth. For example, an appliance (e.g., polymeric appliance) can be formed using a physical model of teeth and a sheet of suitable layers of polymeric material and occlusal blocks. The physical model (e.g., physical mold) of teeth with the occlusal blocks can be formed through a variety of techniques, including 3D printing. The appliance can be formed by thermoforming the appliance over the physical model including occlusal blocks. In some embodiments, a physical appliance is directly fabricated, e.g., using additive manufacturing techniques, from a digital model of an appliance. In some embodiments, the physical appliance may be created through a variety of direct formation techniques, such as 3D printing. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some or most, and even all, of the teeth will be repositioned at some point during treatment. Teeth that are moved can also serve as a base or anchor for holding the appliance as it is worn by the patient. In some embodiments, no wires or other means will be provided for holding an appliance in place over the teeth. In some cases, however, it may be desirable or necessary to provide individual attachments or other anchoring elements on teeth with corresponding receptacles or apertures in the appliance so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the URL "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830, 450.

Figure 3:
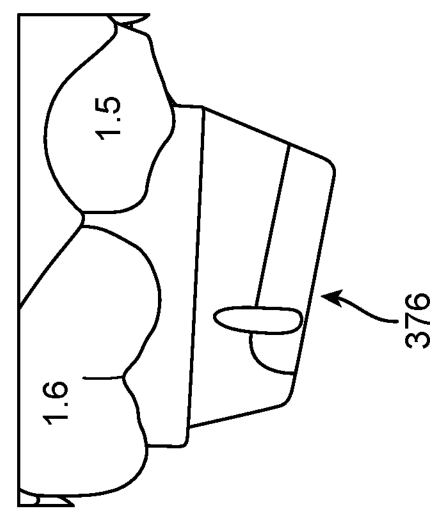
FIG. 3 shows illustrations of models for use in evaluating occlusal block placement, in accordance with some embodiments.
Figure 3:
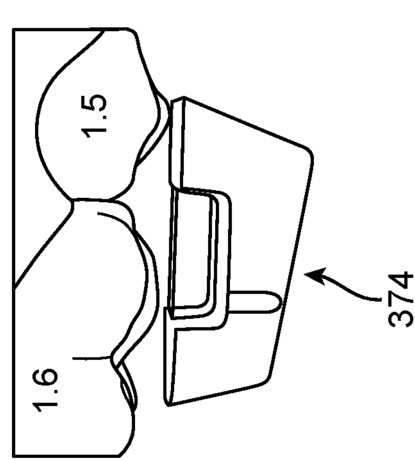
Figure 3:
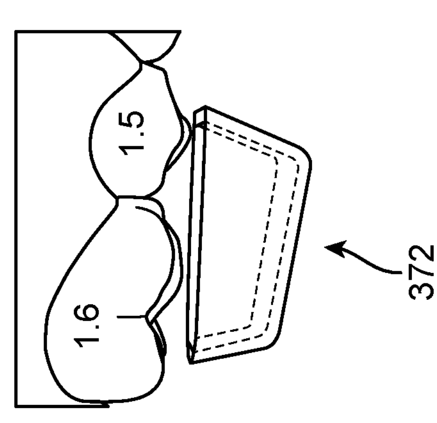
Figure 3:
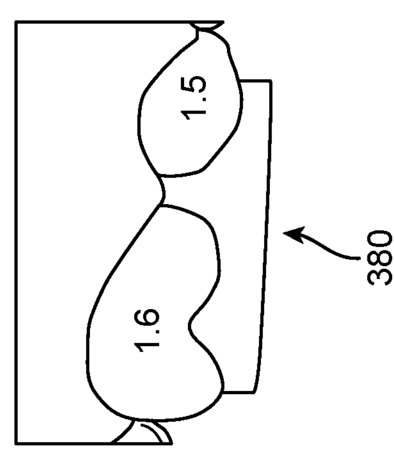
Figure 3:
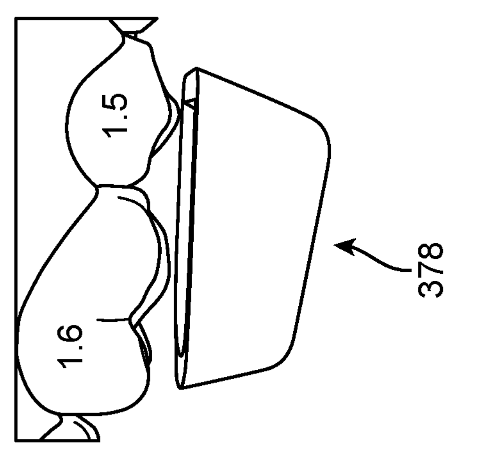

FIG. 3 shows illustrations of models for use in evaluating occlusal block placement. Aligner model 372 is a 3D digital model that represents the shape of a physical aligner's mandibular relocation feature. During fabrication, an aligner may be formed over a mold that may be the shape of the occlusal block. This aligner model 372 represents this shape. The aligner model 372 may represent the exterior surface of the aligner formed over the occlusal block. In some embodiments, the aligner model represents the volume of the aligner over the occlusal block.

The block part model 374 is a 3D digital model that represents the shape of a physical occlusal block. A physical occlusal block fits within the cavity formed by the aligner.

The mold model 376 is a 3D model that represents the shape of the mold used to form the aligner with the mandibular relocation features.

The double aligner cover model 378 is a 3D digital model that represents the shape of a physical aligner's mandibular relocation feature with twice the thickness of the physical aligner. The double aligner cover model 378 may be used when collisions, distances, etc. between a first aligner on a first jaw and a second aligner on a second jaw. Rather than modeling the second aligner over the teeth, a double thickness aligner is used a distances, collisions, etc. are determined based on the double thickness aligner and the tooth model of the opposing jaw.

The attachment collider model 380 is a 3D digital model used to test for interactions with attachments on the patient's teeth. If a mandibular relocation feature is located too close to an attachment, then the aligner shape may reduce or otherwise alter the effectiveness of the attachment. The collider model 380 extends in a gingival direction from beyond the occlusal surface of the teeth.

Figure 4:
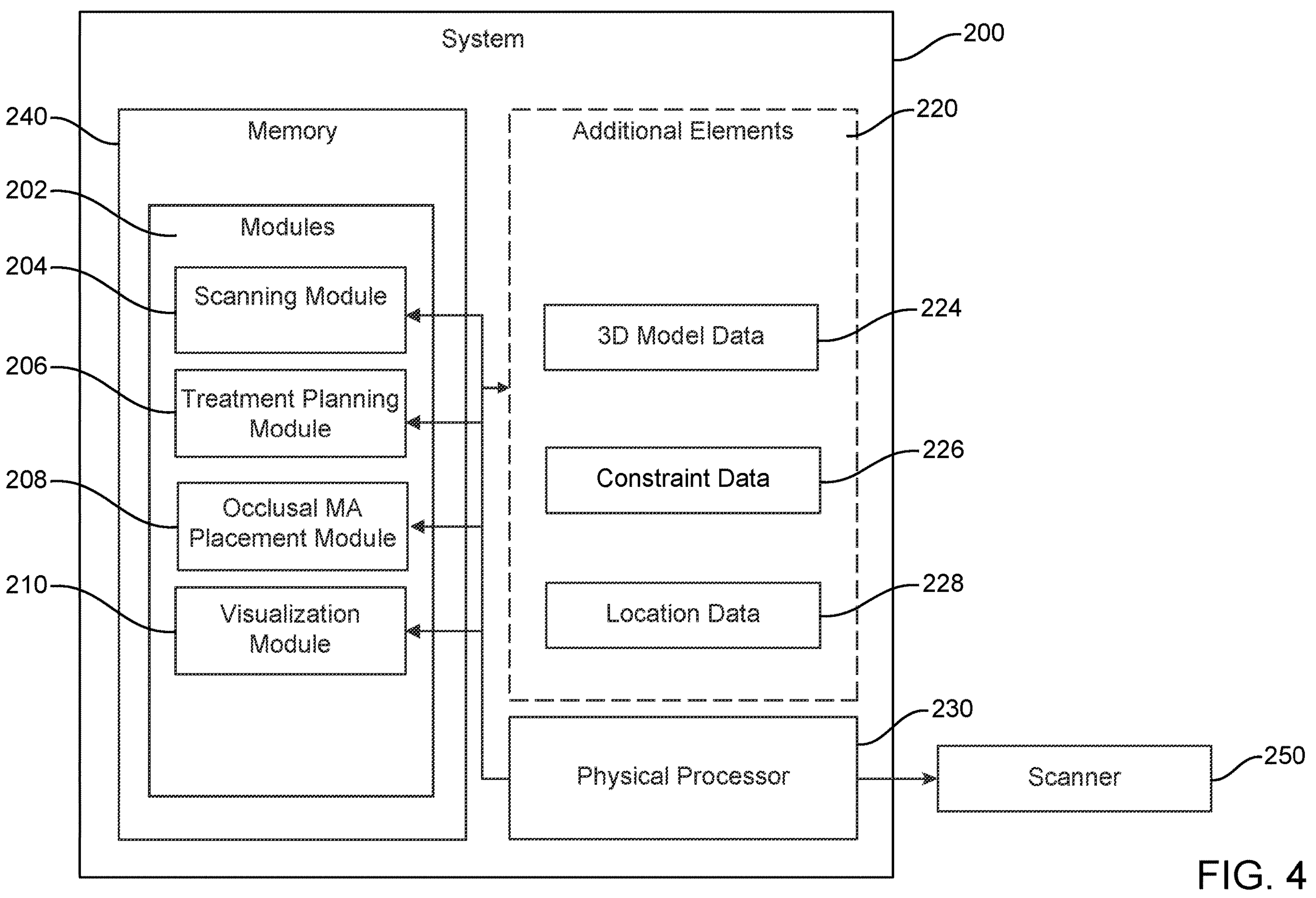
FIG. 4 shows a block diagram of an example system for selecting locations of occlusal blocks on oral appliances, in accordance with some embodiments.

FIG. 4 shows a block diagram of an example system for selecting locations of occlusal blocks on oral appliances and orthodontic treatment.

As illustrated in this figure, example system 200 may include one or more modules 202 for performing one or more tasks. As will be explained in greater detail below, modules 202 may include a scanning module 204, a treatment planning module 206, an occlusal mandibular relocation feature placement module 408, and a visualization module 410. Although illustrated as separate elements, one or more of modules 202 in FIG. 4 may represent portions of a single module or application.

In certain embodiments, one or more of modules 202 in FIG. 4 may represent one or more software applications or programs that, when executed by a computing device, may cause the computing device to perform one or more tasks. For example, and as will be described in greater detail below, one or more of modules 202 may represent modules stored and configured to run on one or more computing devices, such as the devices illustrated in FIG. 20 (e.g., computing system 1010) and/or FIG. 21. One or more of modules 202 in FIG. 4 may also represent all or portions of one or more special-purpose computers configured to perform one or more tasks.

As illustrated in FIG. 4, example system 200 may also include one or more memory devices, such as memory 240. Memory 240 generally represents any type or form of volatile or non-volatile storage device or medium capable of storing data and/or computer-readable instructions. In one example, memory 240 may store, load, and/or maintain one or more of modules 202. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 4, example system 200 may also include one or more physical processors, such as physical processor 230. Physical processor 230 generally represents any type or form of hardware-implemented processing unit capable of interpreting and/or executing computer-readable instructions. In one example, physical processor 230 may access and/or modify one or more of modules 202 stored in memory 240. Additionally or alternatively, physical processor 230 may execute one or more of modules 202 to facilitate selection of MRF locations. Examples of physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 4, example system 200 may also include one or more additional elements 220, such as 3D model data 224, constraint data 226, and location data 228. Additional elements 220 generally represent any type or form of data and permutations thereof. Additional elements 220 may correspond to cached or otherwise stored data values for computation.

Example system 200 in FIG. 4 may be implemented in a variety of ways. For example, all or a portion of example system 200 may represent portions of example computing system 1010 in FIG. 20, described in greater detail below. In one example, all or a portion of the functionality of modules 202 may be performed by computing device 1010 and/or any other suitable computing system. As will be described in greater detail below, one or more of modules 202 from FIG. 4 may, when executed by at least one processor of system 200 (e.g., physical processor 230), enable system 200 to select MRF locations. For example, and as will be described in greater detail below, one or more of modules 202 may cause system 200 and or computing device 1010 to determine candidate locations for each stage, and select locations from the candidate locations based on decreasing a distance between the selected locations.

As illustrated in FIG. 4, example system 200 may also include a scanner 250. The scanner 250 may be an intraoral scanner and may include a probe, such as a handheld probe, for optically capturing three dimensional structures from within the intraoral cavity, such as by confocal focusing of an array of light beams. The scanner 250 may also include other components such as optical components, an accelerometer, communication components, a gyroscope, processing devices, and so on. One example of an intraoral scanner is the iTero® intraoral digital scanner manufactured by Align Technology, Inc.

The scanning module 204 of system 200 may communicate with the scanner 250 to generate an intraoral scan of the patient's dentition. The scanning module 204 may provide a user interface that is shown on a display, where the user interface enables the dental practitioner to interact with a user interface associated with scanning module 204 through manipulation of graphical elements such as graphical icons and visual indicators such as buttons, menus, and so on. The scanning module 204 may include a number of modes, such as a scanning mode, a processing mode, and a delivery mode.

The scan mode allows the dental practitioner to capture images and/or video of a dental site of the patient's dentition, such as for lower arch, upper arch, bite segment, and/or a prepared tooth. The images and/or video may be used to generate a virtual 3D model of the dental site. While in the scan mode, scanning module 204 may register and stitch together intraoral images from the intraoral scanner 250 and generate a digital virtual 3D model of a dental arch or a portion of a dental arch that has been scanned thus far.

During the scan mode, the scanning module 204 may provide the virtual 3-D model or a portion thereof to the display which includes portions of the dental arch that have been scanned.

Once an intraoral scan is complete, or in some embodiments, during the scanning mode, scanning module 204 may also enter an image processing mode. While in the image processing mode, the scanning module 204 may process the intraoral scan data from the one or more scans of the various segments to generate a virtual 3D model of a scanned dental site.

Once the scans are complete, a delivery mode allows the dental practitioner to send the scans and/or virtual 3D model and/or approve the scan for use in treatment planning and mandibular relocation. The scan module may carry out the steps at block 310 of method 300.

The treatment planning module 206 may preform orthodontic and/or mandibular relocation planning. The treatment planning module 206 may generate a treatment plan for treating the patient's teeth. The treatment plan may be a dental treatment plan, such as an orthodontic treatment plan that moves a patient's teeth from a first arrangement towards a second arrangement. The treatment plan may also include mandibular relocation. A treatment plan may move the patient's teeth and/or mandibula from the first position towards a second position in a serios of stages or steps. During treatment a first orthodontic appliance is applied to a patient's teeth in order to reposition the teeth from a first tooth arrangement towards a second tooth arrangement. Then, a second orthodontic appliance is applied to the patient's teeth in order to reposition the teeth from the second tooth arrangement to a third tooth arrangement. New appliances may be worn as necessary using any suitable number and combination of sequential appliances in order to incrementally reposition the patient's teeth from an initial arrangement towards a target arrangement. The appliances can be generated all at the same stage or in sets or batches (e.g., at the beginning of a stage of the treatment), or one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality.

After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

One or more treatment stages are generated based on the digital representation of the teeth, such as the 3D model. The treatment stages can be incremental repositioning stages of a dental treatment procedure designed to move one or more of the patient's teeth or mandible from an initial tooth arrangement to a target arrangement. For example, the treatment stages can be generated by determining the initial tooth arrangement and/or or mandible position indicated by the digital representation, determining a target tooth arrangement and/or mandible position, and determining movement paths of one or more teeth in the initial arrangement necessary to achieve the target tooth arrangement and/or and amount of mandible movement. The movement path can be optimized based on minimizing the total distance moved, preventing collisions between teeth, avoiding tooth movements that are more difficult to achieve, or any other suitable criteria.

The treatment planning module may perform the actions described in block 320 of method 200.

Occlusal MA Placement Module 208 may determine placement of mandibular relocation features based on an optimization of the constraints. The constraints include: jaw opening (FIG. 5), collision avoidance (FIG. 6), block orientation, including block inclination, angulation, and/or rotation (FIG. 7), the difference between a the block orientation and origin of two contacting blocks (FIG. 8), the distance and angle between blocks contact planes of two contacting blocks (FIG. 9), the proximity of the center of a block to the teeth centers (FIG. 10), the size of a gap between the occlusal surfaces of the teeth and an occlusal block (FIG. 11), the distal position of the block (FIG. 12), the arch position of the block (FIG. 13), the vertical engagement of the block pair (FIG. 14), the lateral engagement of the block pair (FIG. 15), the vertical asymmetry (FIG. 16), horizontal asymmetry (FIG. 17), and placement over a missing tooth (FIG. 18). Each constraint is discussed herein in more detail.

The optimization of the placement of the mandibular relocation features may use non-linear optimization algorithms. The algorithms may include one or a combination of interior point nonlinear methods, active set sequential linear-quadratic programming (SLQP) methods, sparse matrix storage methods, multistart methods and/or clustering methods.

The occlusal MA placement module 208 may carry out the steps of block 340 of method 300.

Visualization Module 210 may generate a visualization of the mandibular relocation feature, such as an occlusal block. The visualization may include the location of the occlusal block with respect to each arch. In some embodiments, the occlusal block is generated along with the aligner in which it is located. The visualization may include a 2D or 3D view of the aligner with the occlusal blocks on the patient's teeth. In some embodiments, the visualizations may include generation of attachments placed on the patient's teeth and/or attachment receiving cavities on the aligner. In some embodiments, the visualization may include the upper and lower arches or jaws of the patient in occlusion.

Generating the visualization and providing or otherwise displaying the visualization for a dental professional, such as a dentist or orthodontist, allows the dental professional to approve, modify, or otherwise provide feedback on the block locations. In some embodiments, after receiving feedback, a constraint may be modified, and the optimization may be performed again. For example, a dental professional may reject a block location for one or more stages of treatment due to an unsatisfactory position with respect to one or more constraints, such as, for example, the gap between the occlusal surface of the tooth and the occlusal block. In such cases, the allowable range of the constraint, such as the maximum or minimum gap may be changed, and the optimization may be performed again for that the rejected stage or for all stages of treatment or all stages of treatment where the constraint is outside the modified an updated allowable range. In some embodiments, the weight of the constraint may be increased or decreased back on the feedback. Increasing the weight of the constraint may cause the optimization to prioritize the location of the block with respect to that constraint over other constraints.

Visualization Module 210 may carry out the steps of block 350.

3D model data 224 may include data, such as a 3D model, of the patient's intraoral cavity, including dentition, such as teeth, gingiva, and associated color data, such as color textures applied to the model. The 3D model data 224 may also include digital 3D models of the aligner model 372, the block part model 374, the mold model 376, the double aligner cover model 378, and the attachment collider model 380, discussed above with respect to FIG. 3.

Constraint Data 226 may include data related to the constraints discussed herein. Each constraint may have a weight used in prioritizing the constraint when determining the location of the occlusal block. Each constrain may have a measured value determined based on the 3D models with the mandibular relocation feature or features, such as occlusal blocks, at a particular location or locations. The measured value may be a distance, angle, orientation, etc.

Each constraint may also have one or more thresholds, ranges, or target values used in determining whether or not a constraint is met satisfied. The thresholds may be one or both of a minimum threshold or maximum threshold of distance, angle, orientation, etc. The target may be a target distance, angle, orientation, etc. The range may be a range of distance, angle, orientation, etc.

Location data 228 may include the location of the mandibular advancement features, such as occlusal blocks, with respect to the arch of the patient. The location data 228 may include three-dimensional location and three-dimensional orientation.

Figure 6:
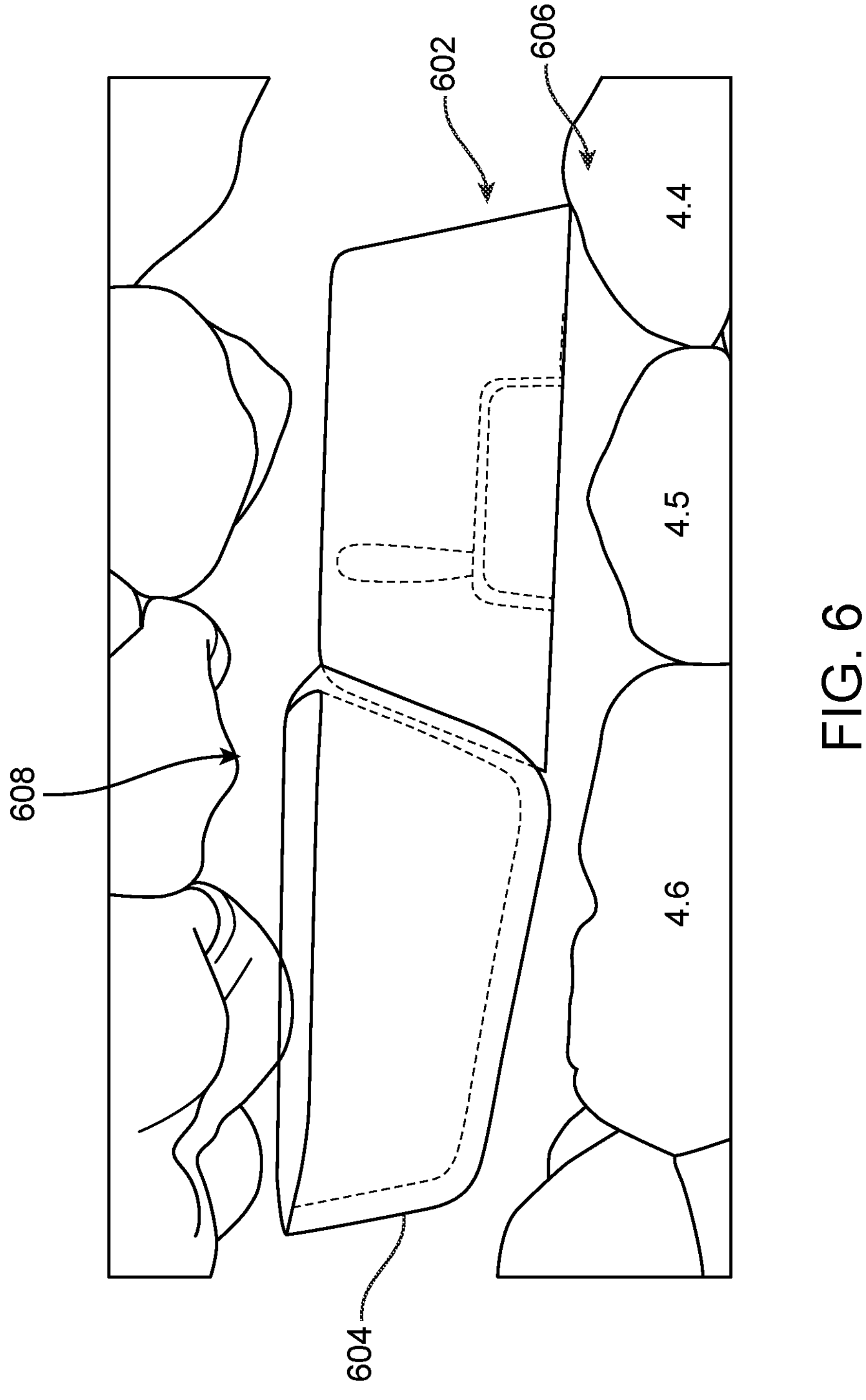
FIG. 6 shows an example of a collision constraint for placing occlusal blocks on oral appliances, in accordance with some embodiments.

FIG. 6 shows an example of a collision constraint for placing occlusal blocks on oral appliances, in accordance with some embodiments. In some embodiments, the collision constraint may prohibit collision between a double aligner block 604 on a first arch 608 with the teeth of an opposite arch 606. In some embodiments, collision constraint may prohibit collision between a block part 602 on a first arch 606 with the teeth of the first arch 606.

Figure 7:
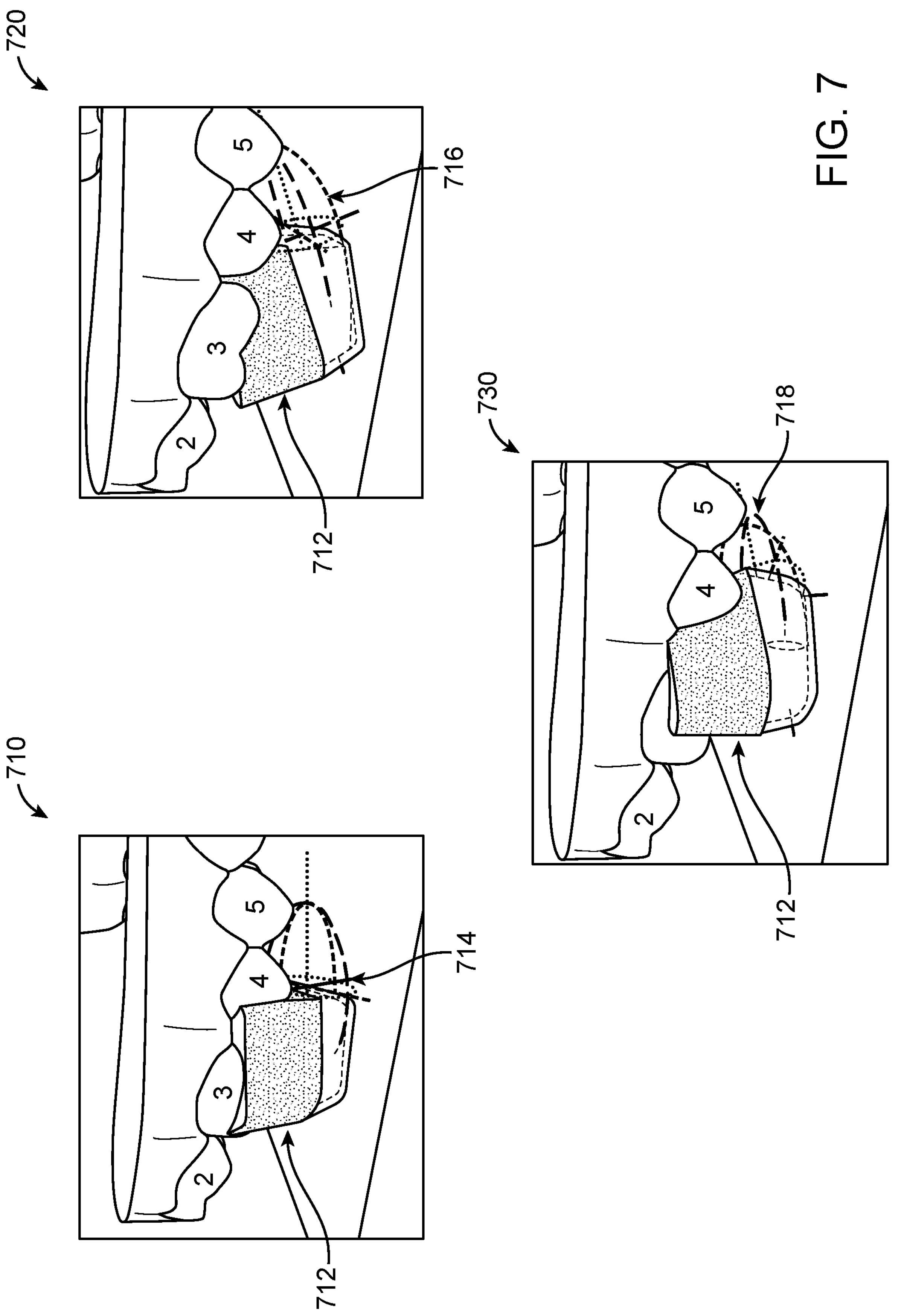
FIG. 7 shows an example of rotational constraints for placing occlusal blocks on oral appliances, in accordance with some embodiments.

FIG. 7 shows an example of rotational constraints for placing occlusal blocks on oral appliances, in accordance with some embodiments. Inclination angle 714 is the angle between occlusal plane normal projected to the plane orthogonal to the block Y-axis and block Z-axis. The block Y-axis and block Z-axis may be defined by the lower surface of the block. The block X axis may be perpendicular to the plane. The image 710 shows an exaggerated inclination angle of the upper-right block towards the buccal direction.

Angulation angle 716 is the angle between occlusal plane normal projected to the plane orthogonal to the block X-axis and block Z-axis. The image 720 shows an exaggerated angulation angle 716 of the upper-right block towards the upper jaw.

Rotation angle 718 is the angle between jaw arch tangent and block Y-axis both projected onto jaw occlusal plane. The image 730 shows an exaggerated rotation angle 718 of the upper-right block towards the buccal direction.

The inclination angle 714, the angulation angle 716, and the rotation angle 718 may be constrained to a range of 0.0 degrees to 5.0 degrees for the inclination angle 714 and the angulation angle 716 and 0.0 degrees to 7.5 degrees for the rotation angle 718.

Although the mandibular relocation feature 712 is depicted as a double aligner model and a mold model, the feature 712 may be depicted as any of the models discussed herein.

Figure 8:
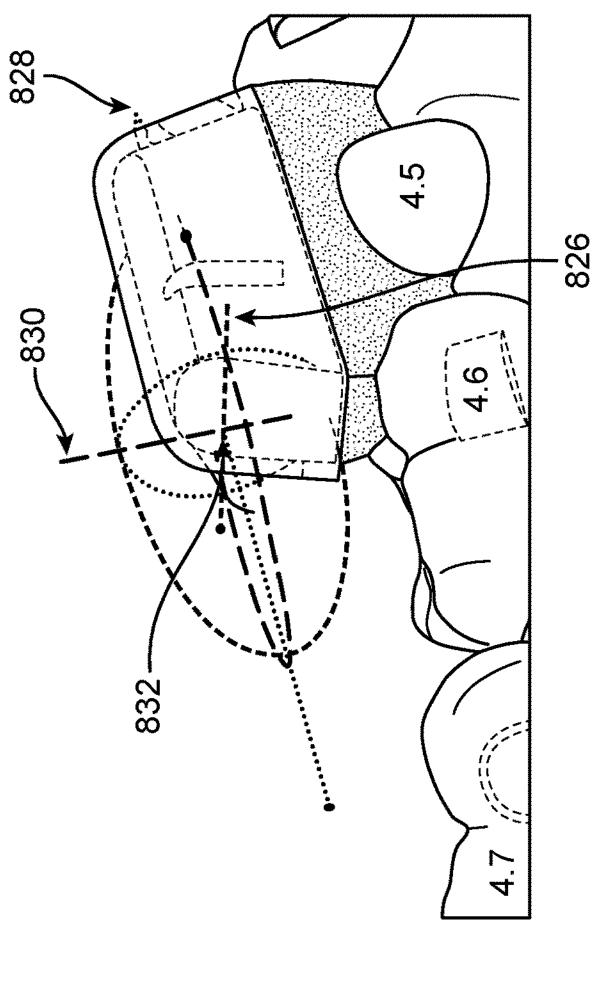
FIG. 8 shows an example of relative location and rotational constraints for placing occlusal blocks on oral appliances, in accordance with some embodiments.

FIG. 8 shows an example of relative location and rotational alignment constraints for placing occlusal blocks on oral appliances, in accordance with some embodiments. The constraints may include an angle between X axes 826 (extending buccally-lingually) of an upper block 814 and a lower block 824. The constraints may include an angle between Y axes 828 (extending mesially distally) of an upper block 814 and a lower block 824. The constraints may include an angle between Z axes 830 (extending occlusal-gingivally) of an upper block 814 and a lower block 824.

The constraints may include a distance between 832 an upper block 814 and a lower block 824. The origin may be located at a midpoint or center point of the engagement surface of the respective upper block 814 and lower block 824.

The angles between the x-axes, the angle between y-axes, and the angle between Z-axes may be constrained to a range of 0.0 degrees to 10 degrees. The distance between origins may be constrained to a range of 0.0 mm to 5.0 mm.

Although the mandibular relocation features 814, 824 are depicted as a double aligner model and a mold model, the feature 712 may be depicted as any of the models discussed herein.

Figure 9:
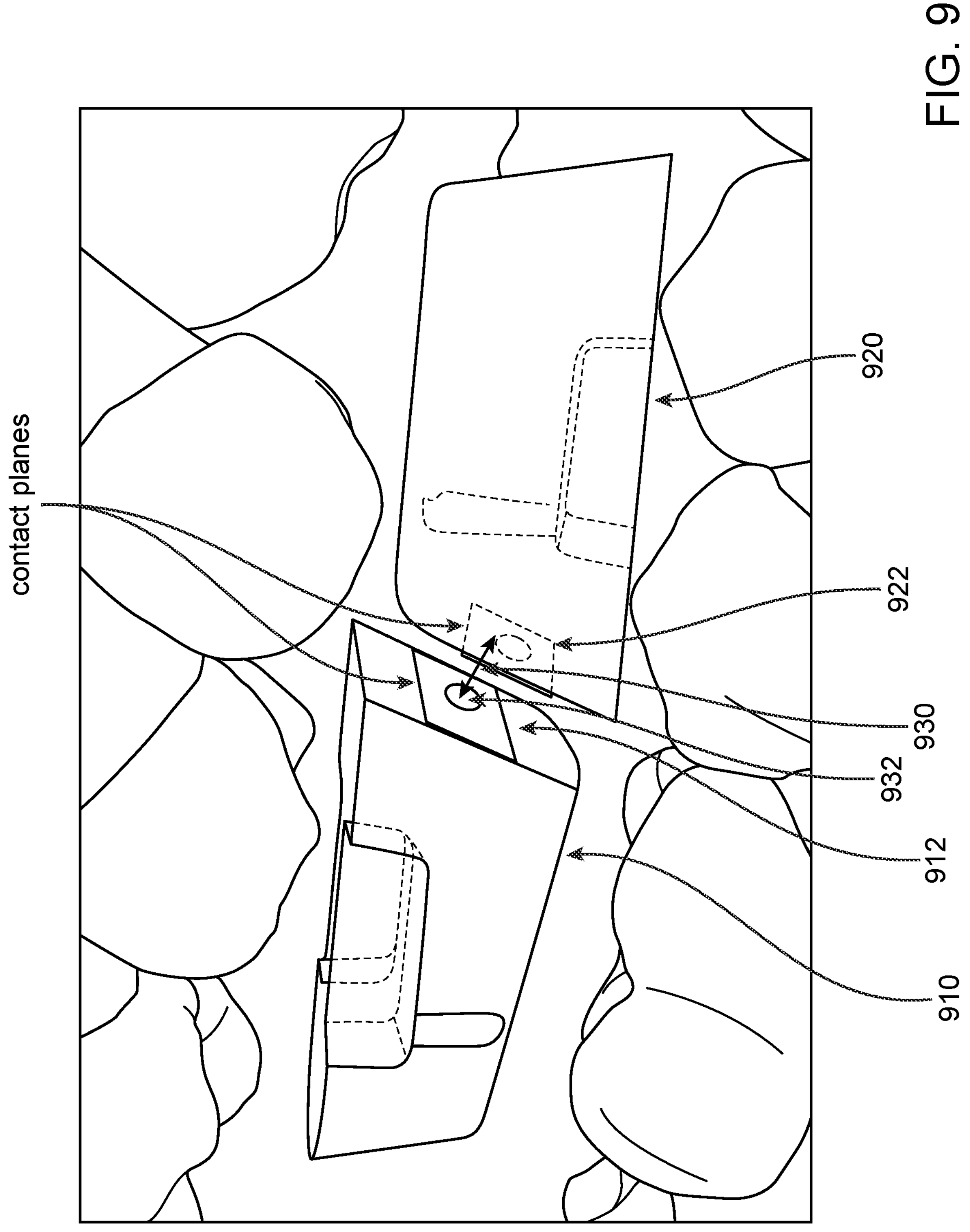
FIG. 9 shows an example of contact plane constraints for placing occlusal blocks on oral appliances, in accordance with some embodiments.

FIG. 9 shows an example of contact plane constraints for placing occlusal blocks on oral appliances, in accordance with some embodiments. The distance 930 may be determined based on the distance between a centroid of the contact plane 922 of the lower block 920 and a centroid of the contact plane 912 of the upper block 910. The angle 932 may be determined based on the angle between a normal of the contact plane the contact plane 922 of the lower block 920 and a normal of the contact plane 912 of the upper block 910. The distance 930 may be greater than twice an aligner thickness, such as between 1.13 mm and 1.25 mm. The angle 932 may be between 0.0 degrees and 1.0 degrees.

Figure 10:
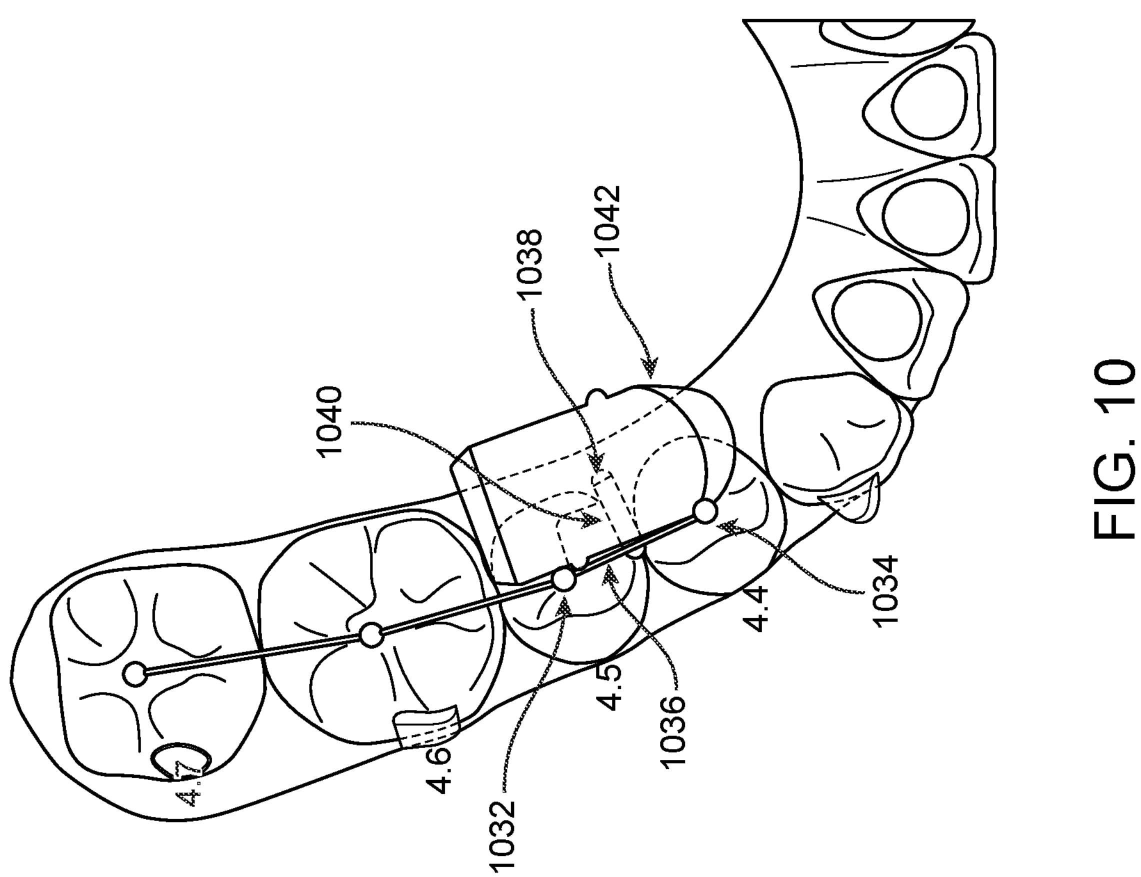
FIG. 10 shows an example of tooth center constraints for placing occlusal blocks on oral appliances, in accordance with some embodiments.

FIG. 10 shows an example of tooth center constraints for placing occlusal blocks on oral appliances, in accordance with some embodiments. The signed distance 1040 from center of mass of the mold or block model 1042 projected onto the occlusal plane to line 1036 connecting centers 1032, 1034 of teeth under block 1042 projected onto the occlusal plane. The signed distance 1040 is negative if the block is placed lingually of the line 1036 and positive if block is placed buccally of the line 1036. The signed distance of the tooth center constraint may be between 0.0 mm and 0.5 mm.

Figure 11:
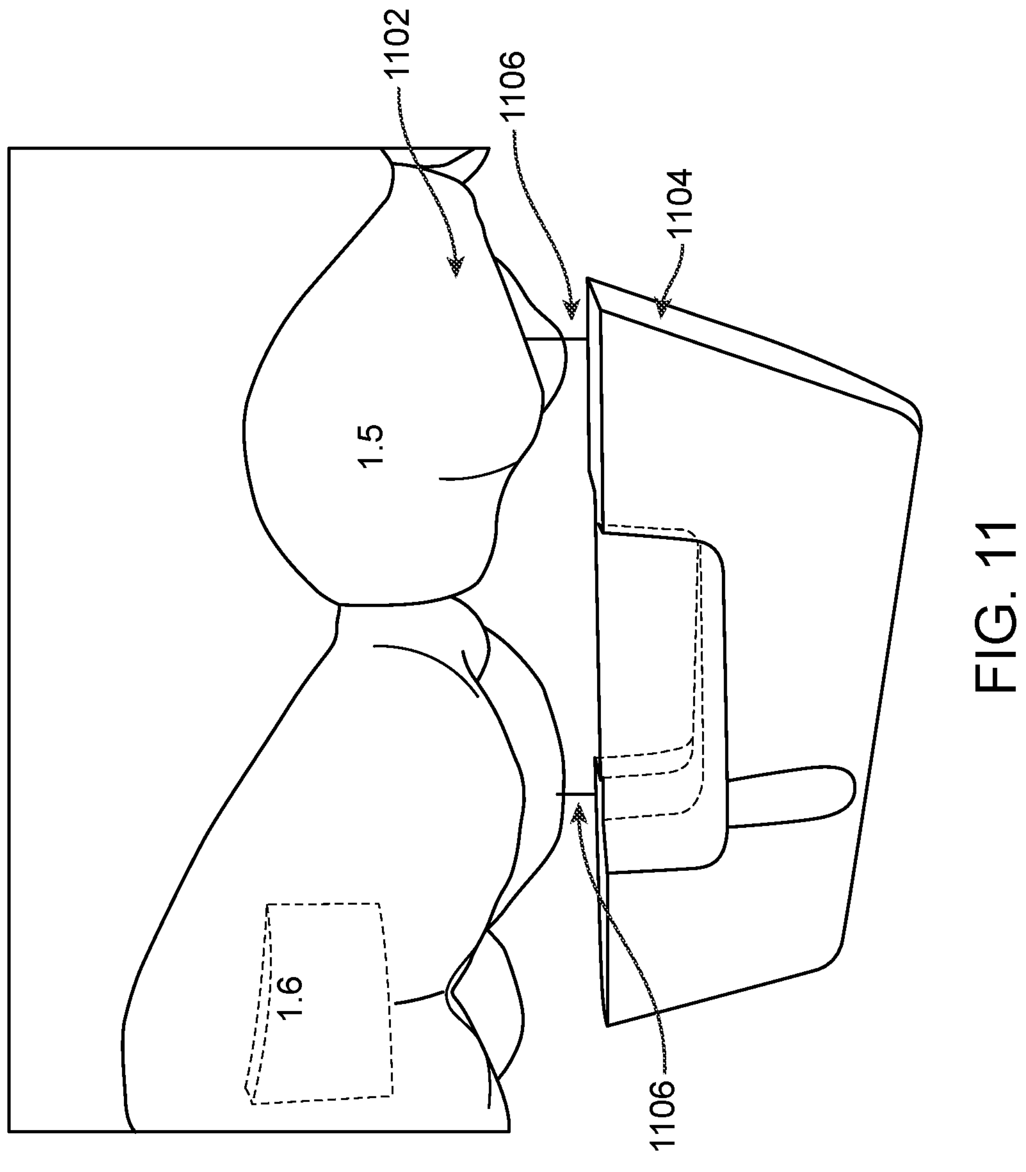
FIG. 11 shows an example of occlusal gap constraints for placing occlusal blocks on oral appliances, in accordance with some embodiments.

FIG. 11 shows an example of occlusal gap constraints for placing occlusal blocks on oral appliances, in accordance with some embodiments. The block gap is determined by finding the smallest distance 1106 between two approximated shapes, the block 1104 and the tooth 1102 or teeth over which the block is placed. The gap is measured as the jaw Z-component of the distance or the shortest distance between a location on the tooth or teeth and the block 1106. Teeth that are not directly "above" or "below" the block, such as positions of teeth that do not overlap with the block's Y axis—roughly along the jaw arch, have a gap value of 0.0. The block gap constraint may be between 0.0 mm and 1.4 mm.

Figure 12:
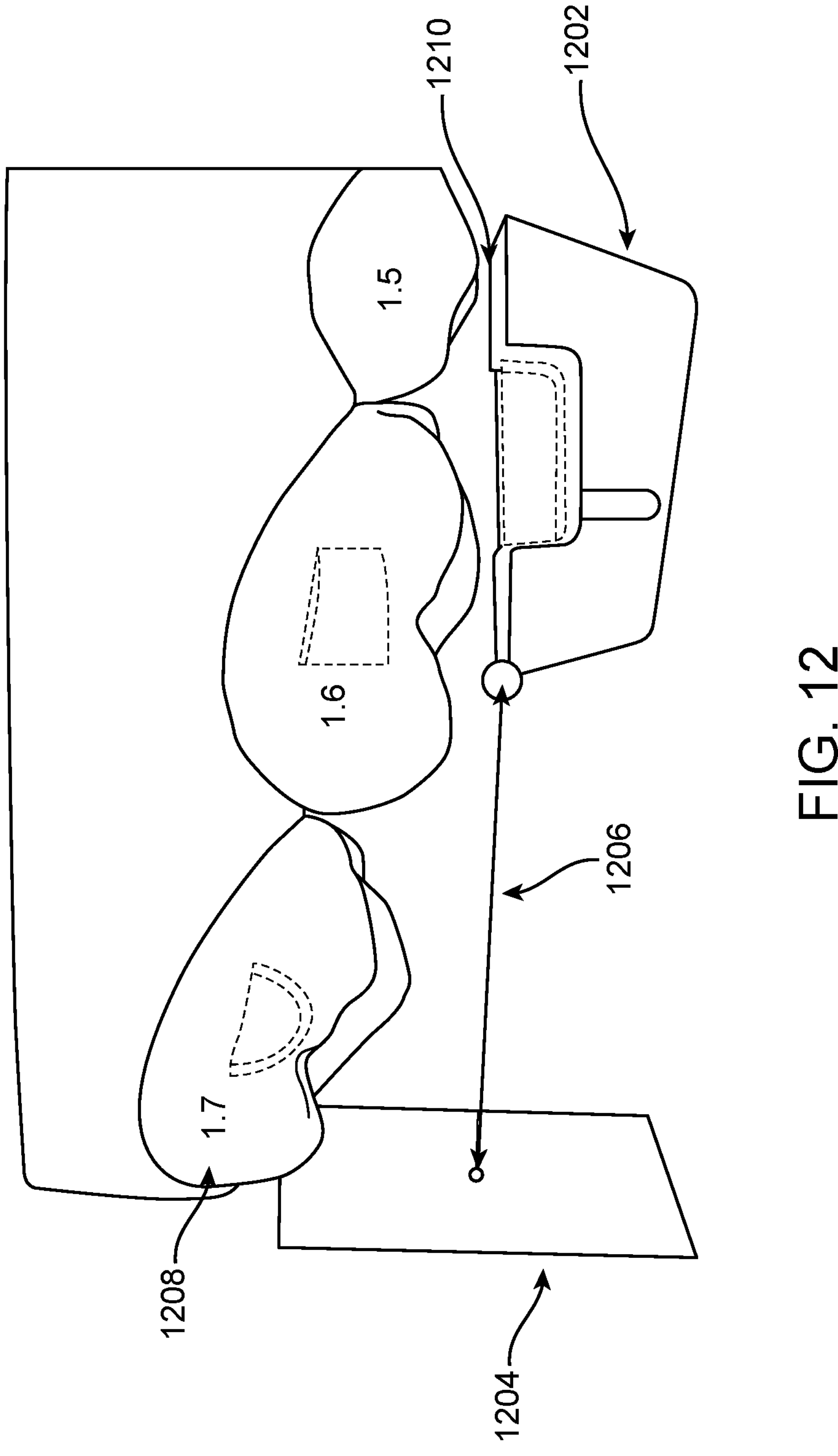
FIG. 12 shows an example of distalization constraints for placing occlusal blocks on oral appliances, in accordance with some embodiments.

FIG. 12 shows an example of distalization constraints for placing occlusal blocks on oral appliances, in accordance with some embodiments. The distalization constraint may be signed distance 1206 between the most distal point of the block 1202 and a plane 1204, that passes through the most distal point of the most distal tooth orthogonally to the jaw arch 1208.

For the most distal block point may be the most distal location on the bottom plane 1210 of the block. The plane position and orientation may be determined by finding the most distal tooth that is not unerupted or pontic, then finding the most distal point of the tooth along the jaw arch spline projected on the occlusal plane and then constructing the plane at that location with normal being the projected jaw arch spline tangent in the most distal point. The signed distance 1206 may be greater than 5.0 mm.

Figure 13:
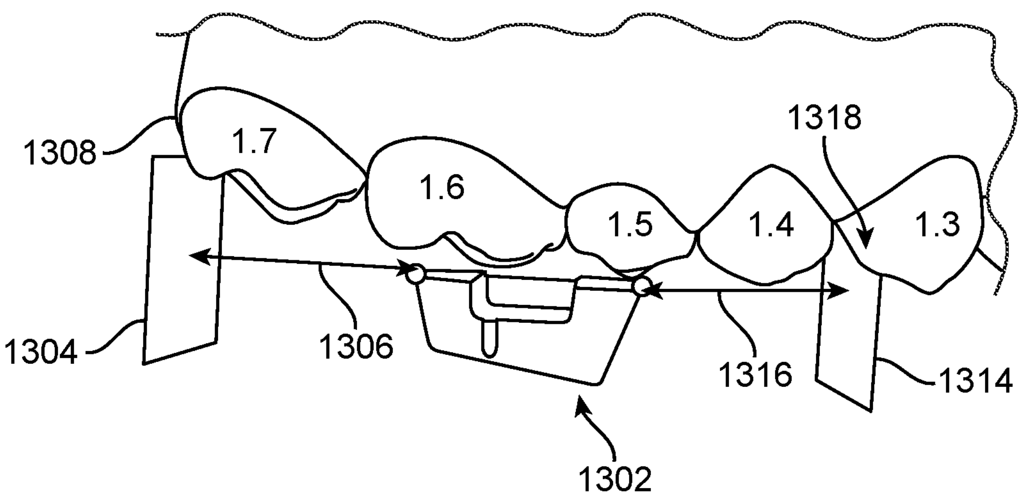
FIG. 13 shows an example of arch location constraints for placing occlusal blocks on oral appliances, in accordance with some embodiments.

FIG. 13 shows an example of arch location constraints for placing occlusal blocks on oral appliances, in accordance with some embodiments. The arch location constraint may be a signed distances 1306, 1316 between the block 1302 and mesial and distal limiting planes 1314, 1304.

The distal limiting plane 1304 is found similarly to the plane 1204, with the exception that the most distal candidate tooth is taken.

Mesial limiting plane 1314 is calculated by finding the most mesial candidate tooth and its most mesial point along the projected jaw arch projected on to the occlusal plane. This point maybe shifted up to 2 mm along a line tangent to the jaw arch projected on to occlusal plane. This point may be shifted by 0.0 to 2.0 mm mesially if the neighboring tooth is not pontic or unerupted.

The signed distances may be 1306, 1316 may be greater than 5.0 mm. In some embodiments, the signed distance may be greater than 0 mm.

Figure 14:
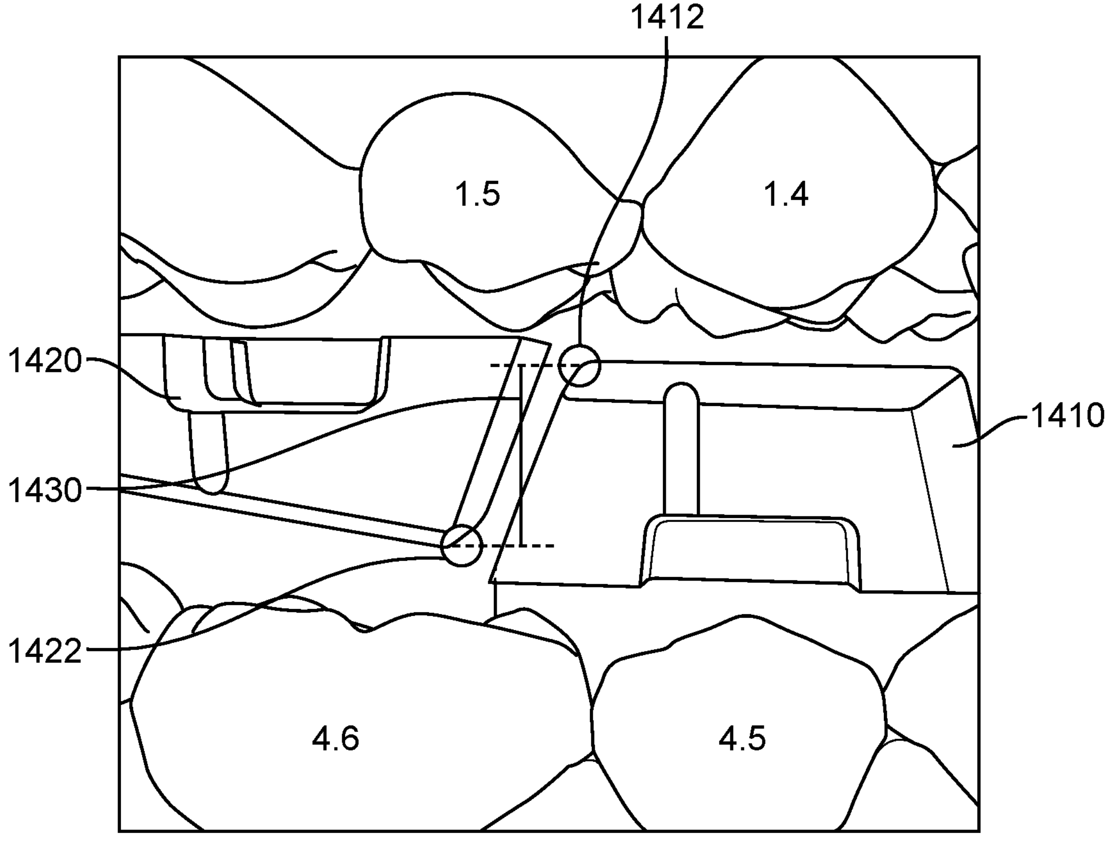
FIG. 14 shows an example of vertical engagement constraints for placing occlusal blocks on oral appliances, in accordance with some embodiments.

FIG. 14 shows an example of vertical engagement constraints for placing occlusal blocks on oral appliances, in accordance with some embodiments. The vertical engagement constraint is the signed distance 1430 between the top block 1420 and the bottom block 1410. The distance may be based on the distance between the location 1412 on the engagement surface of block 1410 that is most vertically or occlusally distant from the base of the block 1410 and the location 1422 on the engagement surface of the block 1420 that is move vertically or occlusally distant from the base of the block 142.

The top block 1420 mesial point 1422 is the most mesial location of the top surface (surface furthest away from the teeth of the arch) of the top block 1420 that engages with the bottom block 1410. The bottom block 1410 mesial point 1412 is the most mesial location of the top surface (surface furthest away from the teeth of the arch) of the bottom block 1420. The signed distance 1430 may be between 3.8 mm and 5.0 mm.

Figure 15:
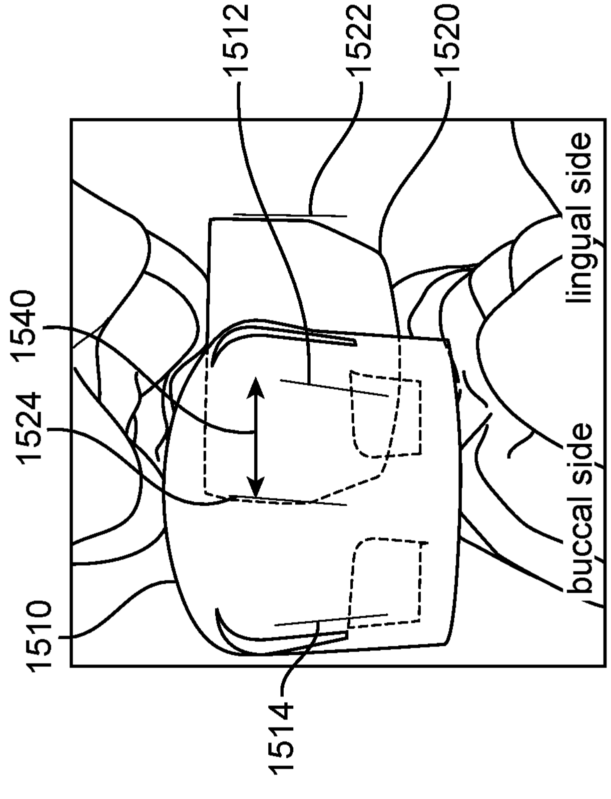
FIG. 15 shows an example of lateral engagement constraints for placing occlusal blocks on oral appliances, in accordance with some embodiments.

FIG. 15 shows an example of lateral engagement constraints for placing occlusal blocks on oral appliances, in accordance with some embodiments. A first lateral constraint may be a distance 1540 from a lingual side 1512 of lower block to buccal side 1524 of upper block 1520. A second lateral constraint may be a distance 1530 from a buccal side 1514 of lower block 1510 to lingual side 1522 of upper block 1520.

For each block the lingual and buccal edges are used as the lingual and buccal sides. The buccal and lingual edges are the respective intersection of a right or left side of the respective block with the engagement surface of the block. The distances 1530, 1540 may be between 5.5 mm and 10.0 mm.

Figure 16:
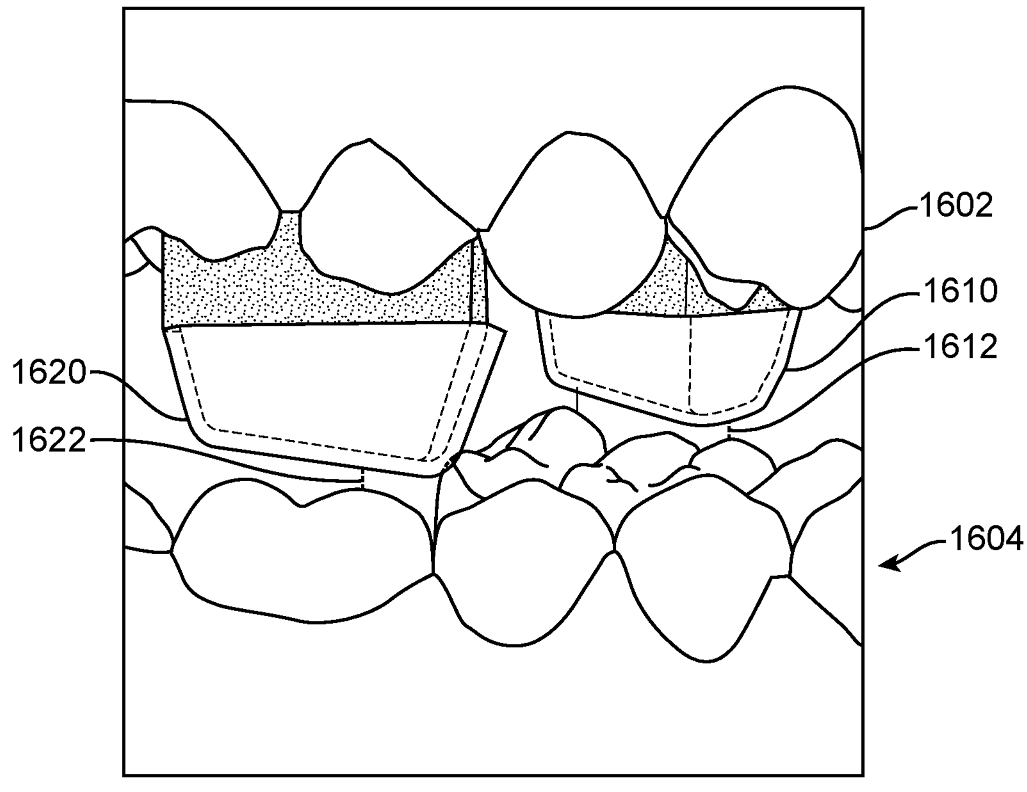
FIG. 16 shows an example of vertical asymmetry constraints for placing occlusal blocks on oral appliances, in accordance with some embodiments.

FIG. 16 shows an example of vertical asymmetry constraints for placing occlusal blocks on oral appliances, in accordance with some embodiments. A vertical asymmetry may be determined based on a difference between a distance 1622 between a a double aligner block 1620 and teeth of an opposite jaw on a first side of an arch and a distance 1612 of a second double aligner block 1610 and teeth of an opposite jaw on a second side of the arch. This constraint is a symmetry constraint. The distances 1622, 1612 are the minimum distance between a respective block and a respective tooth on the opposing jaw. The absolute value of the difference between these the distances 1622, 1612 is the vertical asymmetry constraint. The difference between the distances 1622, 1612 may be between 0.0 and 5.0 mm.

Figure 17:
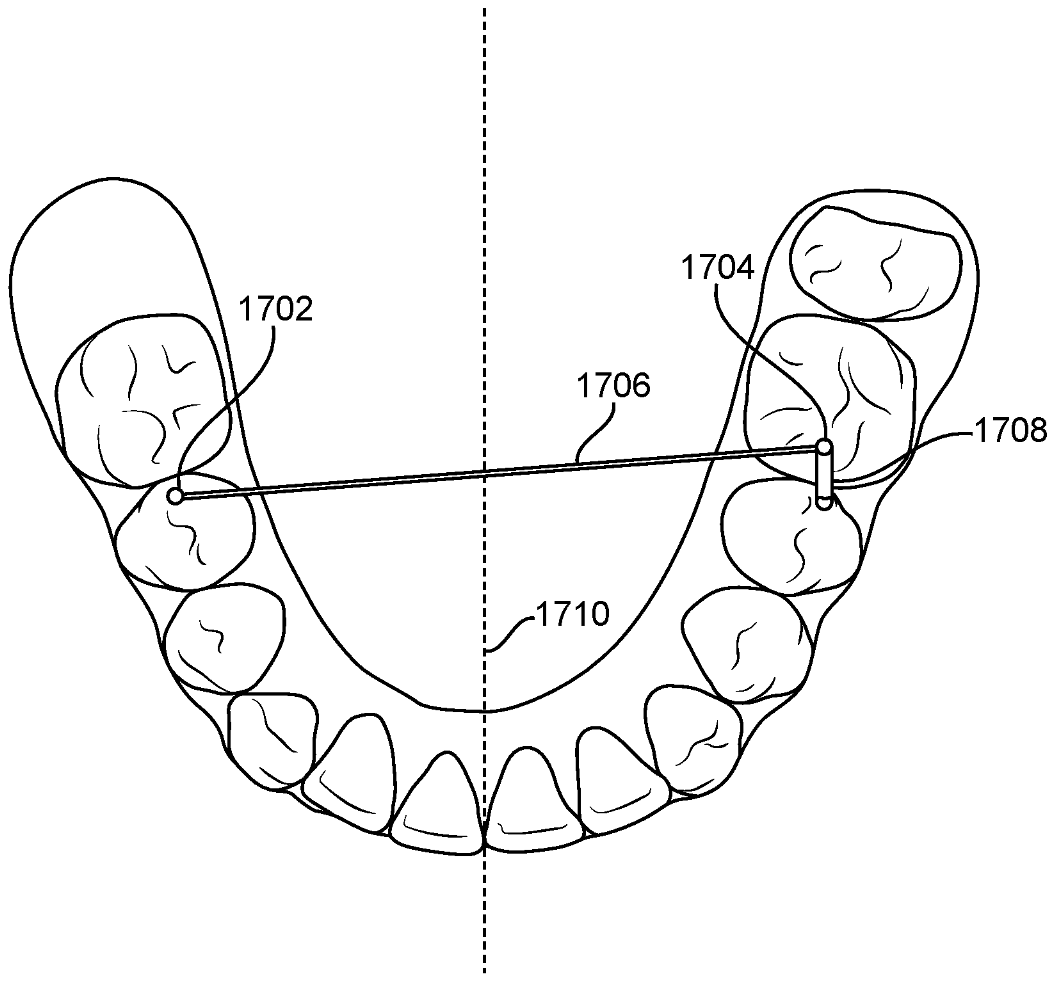
FIG. 17 shows an example of vertical asymmetry constraints for placing occlusal blocks on oral appliances, in accordance with some embodiments.

FIG. 17 shows an example of horizontal asymmetry constraints for placing occlusal blocks on oral appliances, in accordance with some embodiments. The horizontal asymmetry between block pair positions on the left and right side of jaw arches may be a measure of a distance 1708 between centers 1702, 1704 of occlusal blocks on each side of an arch or a patient.

The center of the block may be a center of mass of the block. The vector 1706 between these centers may be projected on jaw midline 1710, which is along the distal-mesial axis through the central incisors. The length of the projection is the measured horizontal asymmetry. The distance 1708 may be between 0.0 mm and 3.0 mm.

Figure 18A:
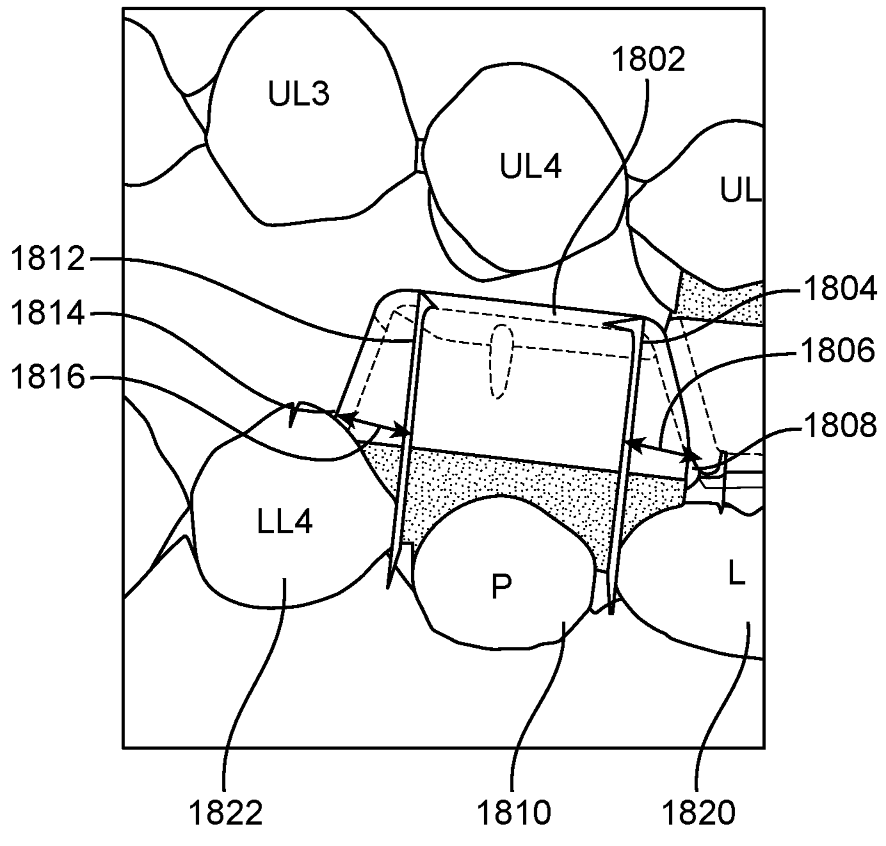
FIGS. 18A and 18B show examples of bridging constraints for placing occlusal blocks on oral appliances, in accordance with some embodiments.
Figure 18B:
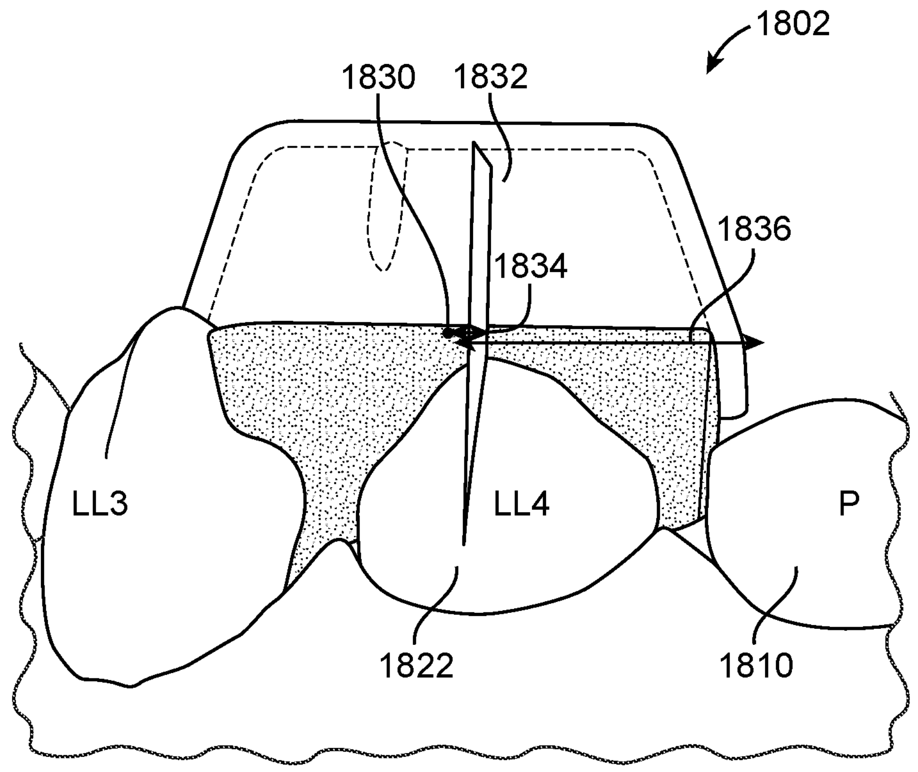

FIGS. 18A and 18B show examples of bridging constraints for placing occlusal blocks on oral appliances, in accordance with some embodiments. For example, when an occlusal block is placed over missing, unerupted tooth, or not fully erupted tooth 1810 in such a manner that it is supported by the two fully erupted neighbor teeth 1820, 1822, such that there is overlap between these teeth and block. The constraints may include a distal bridge distance 1816 and a mesial bridge distance 1806 of the block 1802. The distances 1806 and 1816 describe the length of the block that extends over or is supported by teeth adjacent to a location of a gap, such as a gap formed by an erupting or missing tooth. The distal bridge distance 1816 is a measurement of the distance between a plane 1812 passing through the most mesial location of a distal tooth 1822 supporting the distal end of the block 1802 and the most distal end 1814 of the block 1802. The distance 1816 may be at least 2.0 mm. The mesial bridge distance 1806 is a measurement of the distance between a plane 1804 passing through the most distal location of a mesial tooth 1820 supporting the mesial end 1808 of the block 1802 and the most mesial end of the block 1802. The distance 1806 may be at least 2.0 mm. The distances may be measured along the mesial-distal axis or parallel to the mesial-distal axis of the tooth.

Placing the occlusal block 1802 over an unerupted or missing tooth may include satisfying one of two conditions: That the block is supported by two fully erupted teeth or that the mass center of the block is further away from the missing or unerupted tooth that the closes cusp of the adjacent fully erupted tooth.

FIG. 18A shows how the block may be supported by two fully erupted teeth when the distances 1818 and 1806 are greater than 2.0 mm.

The distance 1806 may be the signed distance between mesial end of the block 1802 and the plane 1804 that passes through the most distal point of the mesial tooth 1820. For the block, the plane is calculated by first finding the neighboring tooth from the mesial side of the unerupted or missing tooth 1810 that is not unerupted or a pontic, then finding the most distal point of the tooth along the jaw arch spline projected on the occlusal plane, in order to avoid unwanted vertical component, and constructing the plane there with normal being the projected jaw arch spline tangent in the most distal point.

The distance 1806 may be the signed distance between distal end of the block 1802 and the plane 1812 that passes through the most distal point of the mesial tooth 1822. For the block, the plane is calculated by first finding the neighboring tooth from the mesial side of the unerupted or missing tooth 1810 that is not unerupted or pontic, then finding the most distal point of the tooth along the jaw arch spline projected on the occlusal plane, in order to avoid unwanted vertical component, and constructing the plane there with normal being the projected jaw arch spline tangent in the most distal point.

FIG. 18B shows how a block may be placed to satisfy the other condition, that the mass center 1824 of the block 1802 may be further away from the missing or unerupted tooth than the closest cusp of the adjacent fully erupted tooth. If the fully erupted tooth is a mesial tooth, then the distance between the closest cusp of the mesial tooth and the center of mass of the block 1830 is determined by the distance 1834 between the center of mass of the block 1830 and the plane 1832 that passes through the most distal cusp of the mesial tooth. The location of the plane 1832 is calculated by first finding the neighboring tooth from the mesial side that is not unerupted or pontic, then finding the most distal cusp of the tooth and constructing the plane there with normal being the projected jaw arch spline tangent in the cusp point projected on the jaw arch spline. The distance 1834 is the distance between the plane 1832 and the center of mass 1830.

If the fully erupted tooth is a distal tooth, then the distance between the closest cusp of the distal tooth and the center of mass of the block 1830 is determined by the distance 1834 between the center of mass of the block 1830 and the plane 1832 that passes through the most mesial cusp of the distal tooth. The location of the plane 1832 is calculated by first finding the neighboring tooth from the distal side that is not unerupted or a pontic, then finding the most mesial cusp of the tooth and constructing the plane there with normal being the projected jaw arch spline tangent in the cusp point projected on the jaw arch spline. The distance 1834 is the distance between the plane 1832 and the center of mass 1830.

The distance between the center of mass 1830 and the location of the missing or unerupted tooth, such as the pontic 1810 is distance 1836. The location of the pontic or missing tooth may be based, for example, on a plane passing though the location on the non-missing tooth 1822 adjacent that is closest to the missing tooth. In some embodiments, the location may be a plane passing through the location on the pontic that is closes the non-missing adjacent tooth 1822.

If the distance 1830 is less than the distance 1836, then the block 1802 may be placed.

Figure 19:
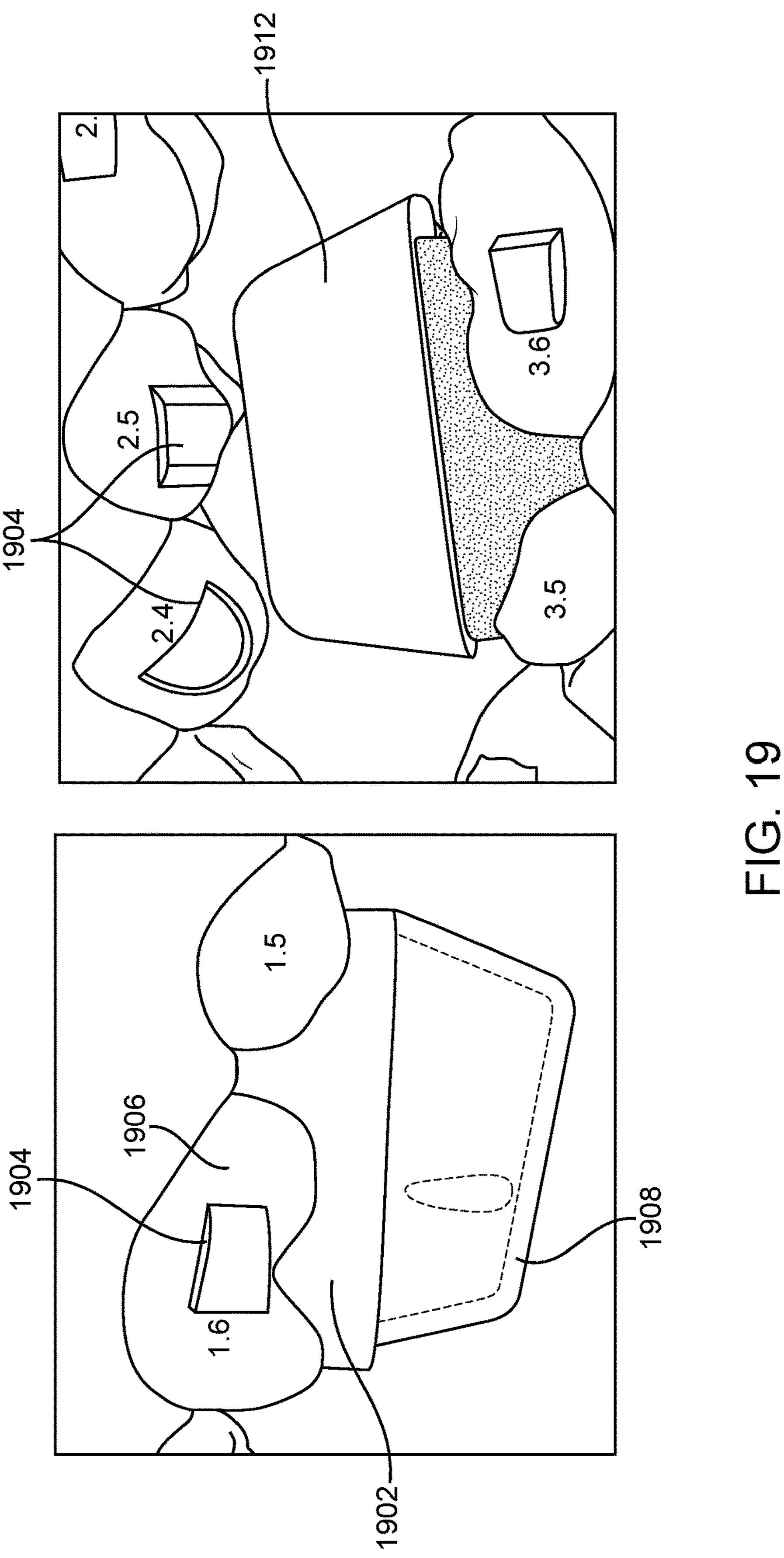
FIG. 19 shows an example of an attachment constraints for placing occlusal blocks on oral appliances, in accordance with some embodiments.

FIG. 19 shows an example of attachment constraints for placing occlusal blocks on oral appliances, in accordance with some embodiments. The occlusal block's geometry and position should allow for placement of attachments on teeth under blocks. In some instances, the block and the aligner near the block may cause interference with the use of attachments. The blocks and attachments 1904 should be placed so that they do not interfere with each other. The constraint for interference between a block 1908 and an attachment 1904 on a tooth 1906 of the same arch is a collision between an attachment activator model, which is a projection of the plane of the bottom surface of the aligner and block, and a model of the attachment 1904. The constraint for collision between an occlusal block and an attachment on a tooth of an opposite jaw is a double aligner 1902 and the attachment models. The constraint is met if there is no collision.

FIG. 20 is a block diagram of an example computing system 1010 capable of implementing one or more of the embodiments described and/or illustrated herein. For example, all or a portion of computing system 1010 may perform and/or be a means for performing, either alone or in combination with other elements, one or more of the steps described herein (such as one or more of the steps illustrated in FIG. 2). All or a portion of computing system 1010 may also perform and/or be a means for performing any other steps, methods, or processes described and/or illustrated herein.

Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may include at least one processor 1014 and a system memory 1016.

Processor 1014 generally represents any type or form of physical processing unit (e.g., a hardware-implemented central processing unit) capable of processing data or interpreting and executing instructions. In certain embodiments, processor 1014 may receive instructions from a software application or module. These instructions may cause processor 1014 to perform the functions of one or more of the example embodiments described and/or illustrated herein.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1010 may include both a volatile memory unit (such as, for example, system memory 1016) and a non-volatile storage device (such as, for example, primary storage device 1032, as described in detail below). In one example, one or more of modules 202 from FIG. 4 may be loaded into system memory 1016.

In some examples, system memory 1016 may store and/or load an operating system 1040 for execution by processor 1014. In one example, operating system 1040 may include and/or represent software that manages computer hardware and software resources and/or provides common services to computer programs and/or applications on computing system 1010. Examples of operating system 1040 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 1010 may also include one or more components or elements in addition to processor 1014 and system memory 1016. For example, as illustrated in FIG. 20, computing system 1010 may include a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an Industry Standard Architecture (ISA), Peripheral Component Interconnect (PCI), PCI Express (PCIe), or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012.

I/O controller 1020 generally represents any type or form of module capable of coordinating and/or controlling the input and output functions of a computing device. For example, in certain embodiments I/O controller 1020 may control or facilitate transfer of data between one or more elements of computing system 1010, such as processor 1014, system memory 1016, communication interface 1022, display adapter 1026, input interface 1030, and storage interface 1034.

As illustrated in FIG. 20, computing system 1010 may also include at least one display device 1024 coupled to I/O controller 1020 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 20, example computing system 1010 may also include at least one input device 1028 coupled to I/O controller 1020 via an input interface 1030. Input device 1028 generally represents any type or form of input device capable of providing input, either computer or human generated, to example computing system 1010. Examples of input device 1028 include, without limitation, a keyboard, a pointing device, a speech recognition device, variations or combinations of one or more of the same, and/or any other input device.

Additionally or alternatively, example computing system 1010 may include additional I/O devices. For example, example computing system 1010 may include I/O device 1036. In this example, I/O device 1036 may include and/or represent a user interface that facilitates human interaction with computing system 1010. Examples of I/O device 1036 include, without limitation, a computer mouse, a keyboard, a monitor, a printer, a modem, a camera, a scanner, a microphone, a touchscreen device, variations or combinations of one or more of the same, and/or any other I/O device.

Communication interface 1022 broadly represents any type or form of communication device or adapter capable of facilitating communication between example computing system 1010 and one or more additional devices. For example, in certain embodiments communication interface 1022 may facilitate communication between computing system 1010 and a private or public network including additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution.

In some examples, system memory 1016 may store and/or load a network communication program 1038 for execution by processor 1014. In one example, network communication program 1038 may include and/or represent software that enables computing system 1010 to establish a network connection 1042 with another computing system (not illustrated in FIG. 20) and/or communicate with the other computing system by way of communication interface 1022. In this example, network communication program 1038 may direct the flow of outgoing traffic that is sent to the other computing system via network connection 1042. Additionally or alternatively, network communication program 1038 may direct the processing of incoming traffic that is received from the other computing system via network connection 1042 in connection with processor 1014.

Although not illustrated in this way in FIG. 20, network communication program 1038 may alternatively be stored and/or loaded in communication interface 1022. For example, network communication program 1038 may include and/or represent at least a portion of software and/or firmware that is executed by a processor and/or Application Specific Integrated Circuit (ASIC) incorporated in communication interface 1022.

As illustrated in FIG. 20, example computing system 1010 may also include a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a solid state drive, a floppy disk drive, a magnetic tape drive, an optical disk drive, a flash drive, or the like. Storage interface 1034 generally represents any type or form of interface or device for transferring data between storage devices 1032 and 1033 and other components of computing system 1010. In one example, data elements 420 from FIG. 4 may be stored and/or loaded in primary storage device 1032.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also include other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

Many other devices or subsystems may be connected to computing system 1010. Conversely, all of the components and devices illustrated in FIG. 20 need not be present to practice the embodiments described and/or illustrated herein. The devices and subsystems referenced above may also be interconnected in different ways from that shown in FIG. 20. Computing system 1010 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 1010 may be configured as an Application Specific Integrated Circuit (ASIC) adapted to implement one or more of the example embodiments disclosed herein.

FIG. 21 is a block diagram of an example network architecture 1100 in which client systems 1110, 1120, and 1130 and servers 1140 and 1145 may be coupled to a network 1150. As detailed above, all or a portion of network architecture 1100 may perform and/or be a means for performing, either alone or in combination with other elements, one or more of the steps disclosed herein (such as one or more of the steps illustrated in FIG. 2). All or a portion of network architecture 1100 may also be used to perform and/or be a means for performing other steps and features set forth in the instant disclosure.

Client systems 1110, 1120, and 1130 generally represent any type or form of computing device or system, such as example computing system 1010 in FIG. 20. Similarly, servers 1140 and 1145 generally represent computing devices or systems, such as application servers or database servers, configured to provide various database services and/or run certain software applications. Network 1150 generally represents any telecommunication or computer network including, for example, an intranet, a WAN, a LAN, a PAN, or the Internet. In one example, client systems 1110, 1120, and/or 1130 and/or servers 1140 and/or 1145 may include all or a portion of system 400 from FIG. 4.

As illustrated in FIG. 21, one or more storage devices 1160(1)-(N) may be directly attached to server 1140. Similarly, one or more storage devices 1170(1)-(N) may be directly attached to server 1145. Storage devices 1160(1)-(N) and storage devices 1170(1)-(N) generally represent any type or form of storage device or medium capable of storing data and/or other computer-readable instructions. In certain embodiments, storage devices 1160(1)-(N) and storage devices 1170(1)-(N) may represent Network-Attached Storage (NAS) devices configured to communicate with servers 1140 and 1145 using various protocols, such as Network File System (NFS), Server Message Block (SMB), or Common Internet File System (CIFS).

Servers 1140 and 1145 may also be connected to a Storage Area Network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to example computing system 1010 of FIG. 10, a communication interface, such as communication interface 1022 in FIG. 20, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 21 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the example embodiments disclosed herein may also be encoded as a computer program, stored in server 1140, run by server 1145, and distributed to client systems 1110, 1120, and 1130 over network 1150.

As detailed above, computing system 1010 and/or one or more components of network architecture 1100 may perform and/or be a means for performing, either alone or in combination with other elements, one or more steps of an example method for selecting MRF locations for oral appliances for MR treatment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 200 in FIG. 4 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 200 in FIG. 4 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 200 in FIG. 4 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 200 in FIG. 4 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 200 in FIG. 4 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 200 in FIG. 4 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSD s), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Figure 22:
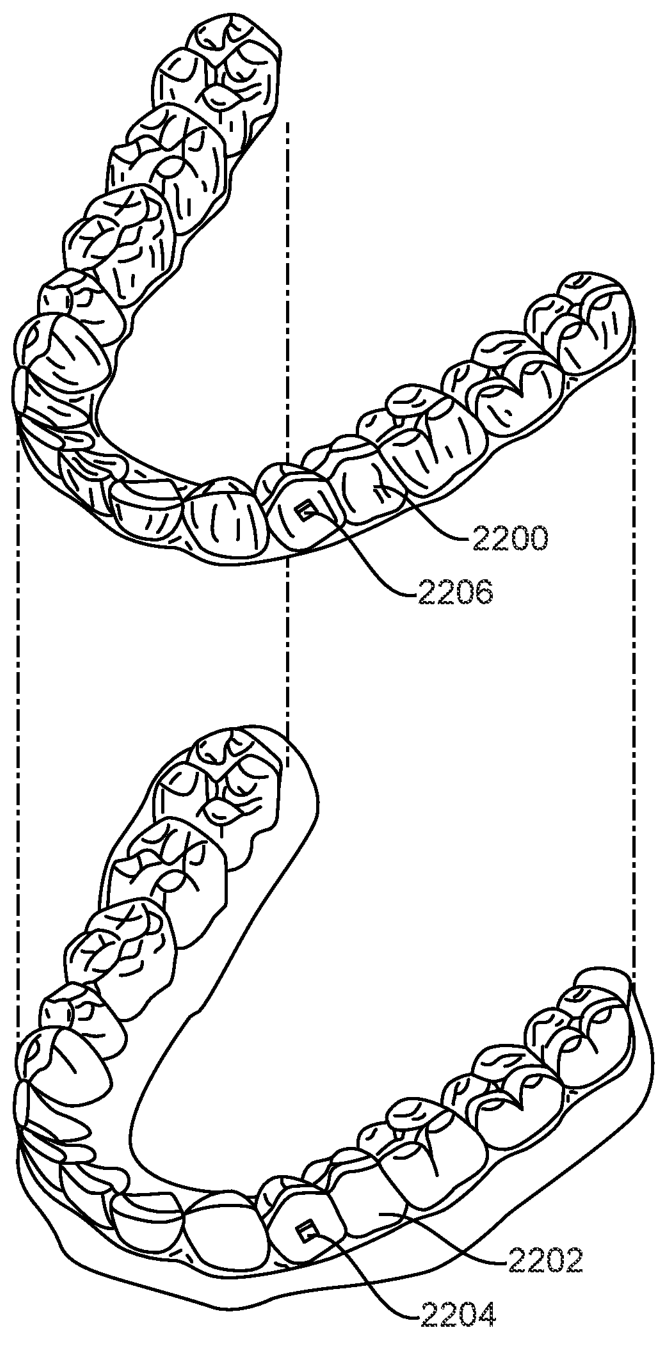
FIG. 22 illustrates an exemplary tooth repositioning appliance or aligner that can be worn by a patient in order to achieve an incremental repositioning of individual teeth in the jaw, in accordance with some embodiments.

FIG. 22 illustrates an exemplary tooth repositioning appliance 2200, such as an aligner that can be worn by a patient in order to achieve an incremental repositioning of individual teeth 1102 in the jaw. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. The physical model (e.g., physical mold) of teeth can be formed through a variety of techniques, including 3D printing. The appliance can be formed by thermoforming the appliance over the physical model. In some embodiments, a physical appliance is directly fabricated, e.g., using additive manufacturing techniques, from a digital model of an appliance. In some embodiments, the physical appliance may be created through a variety of direct formation techniques, such as 3D printing. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some or most, and even all, of the teeth will be repositioned at some point during treatment. Teeth that are moved can also serve as a base or anchor for holding the appliance as it is worn by the patient. In some embodiments, no wires or other means will be provided for holding an appliance in place over the teeth. In some cases, however, it may be desirable or necessary to provide individual attachments or other anchoring elements 2204 on teeth 2202 with corresponding receptacles or apertures 2206 in the appliance 2200 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the URL "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 23:
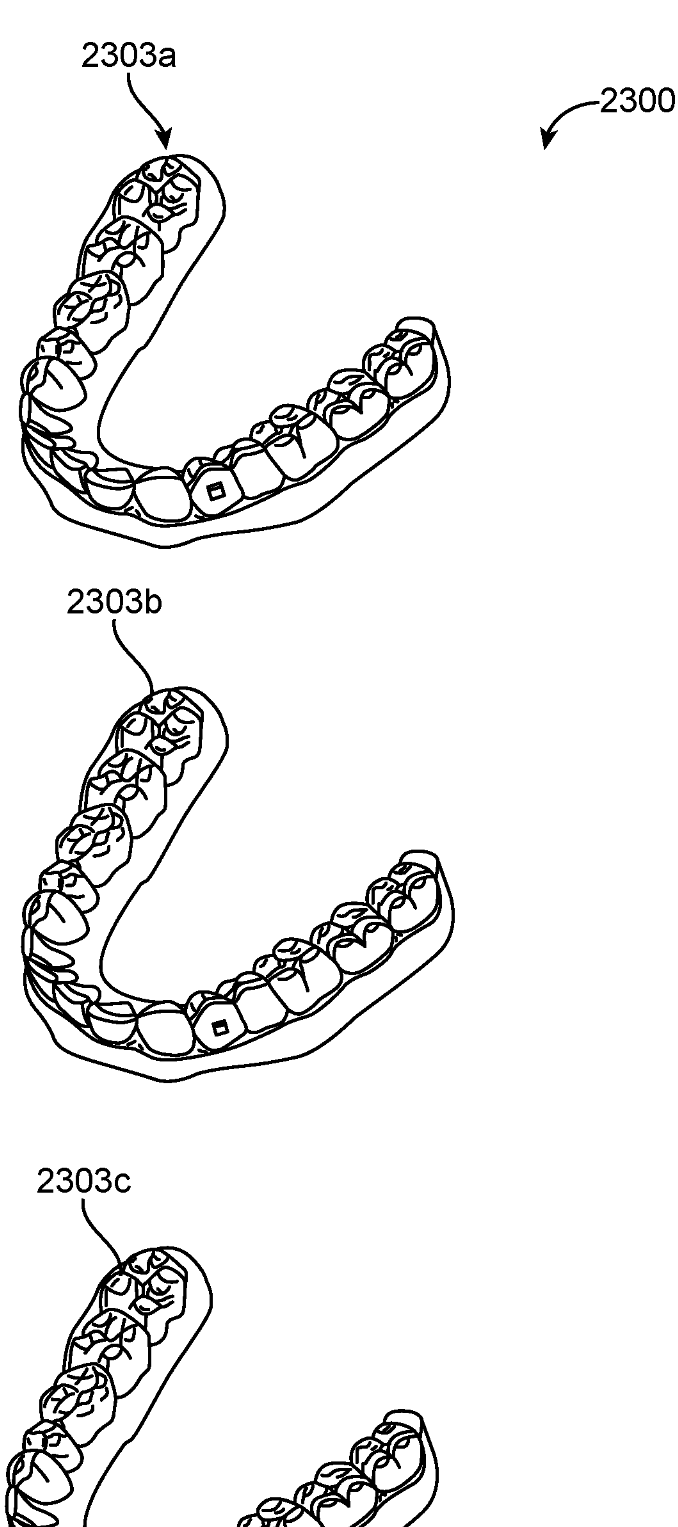
FIG. 23 illustrates a tooth repositioning system, in accordance with some embodiments.

FIG. 23 illustrates a tooth repositioning system 2300 including a plurality of appliances 2303A, 2303B, 2303C. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 2300 can include a first appliance 2303A corresponding to an initial tooth arrangement, one or more intermediate appliances 2303B corresponding to one or more intermediate arrangements, and a final appliance 2303C corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Optionally, in cases involving more complex movements or treatment plans, it may be beneficial to utilize auxiliary components (e.g., features, accessories, structures, devices, components, and the like) in conjunction with an orthodontic appliance. Examples of such accessories include but are not limited to elastics, wires, springs, bars, arch expanders, palatal expanders, twin blocks, occlusal blocks, bite ramps, mandibular advancement splints, bite plates, pontics, hooks, brackets, headgear tubes, springs, bumper tubes, palatal bars, frameworks, pin-and-tube apparatuses, buccal shields, buccinator bows, wire shields, lingual flanges and pads, lip pads or bumpers, protrusions, divots, and the like. In some embodiments, the appliances, systems and methods described herein include improved orthodontic appliances with integrally formed features that are shaped to couple to such auxiliary components, or that replace such auxiliary components.

Figure 24:
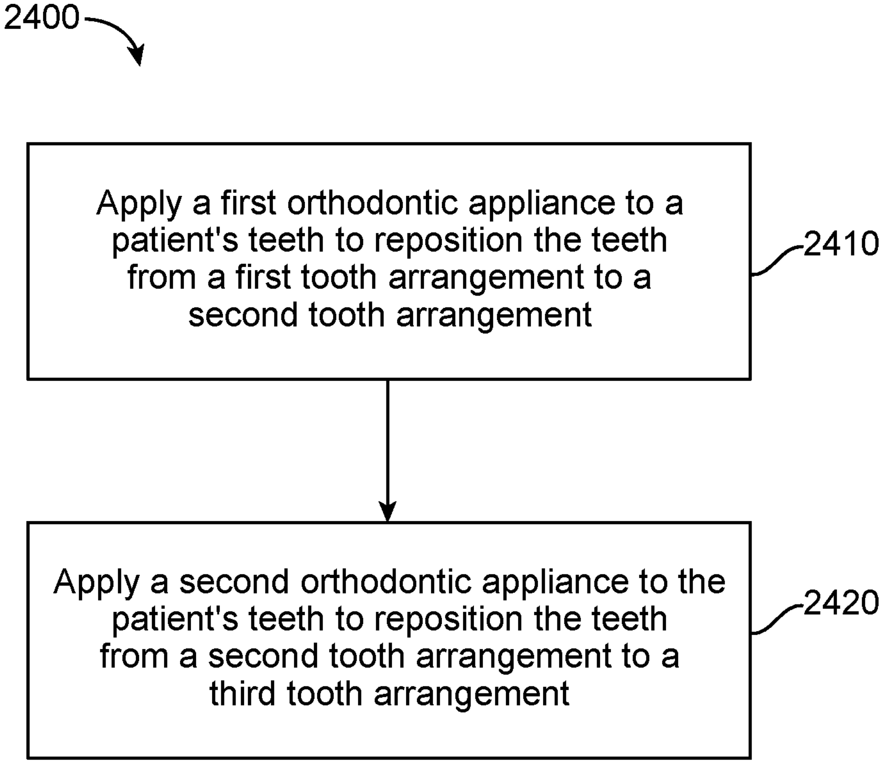
FIG. 24 shows a method of orthodontic treatment using a plurality of appliances, in accordance with embodiments.

FIG. 24 illustrates a method 2400 of orthodontic treatment using a plurality of appliances, in accordance with many embodiments. The method 2400 can be practiced using any of the appliances or appliance sets described herein. In step 2410, a first orthodontic appliance is applied to a patient's teeth in order to reposition the teeth from a first tooth arrangement to a second tooth arrangement. In step 2420, a second orthodontic appliance is applied to the patient's teeth in order to reposition the teeth from the second tooth arrangement to a third tooth arrangement. The method 2400 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances).

The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Figure 25:
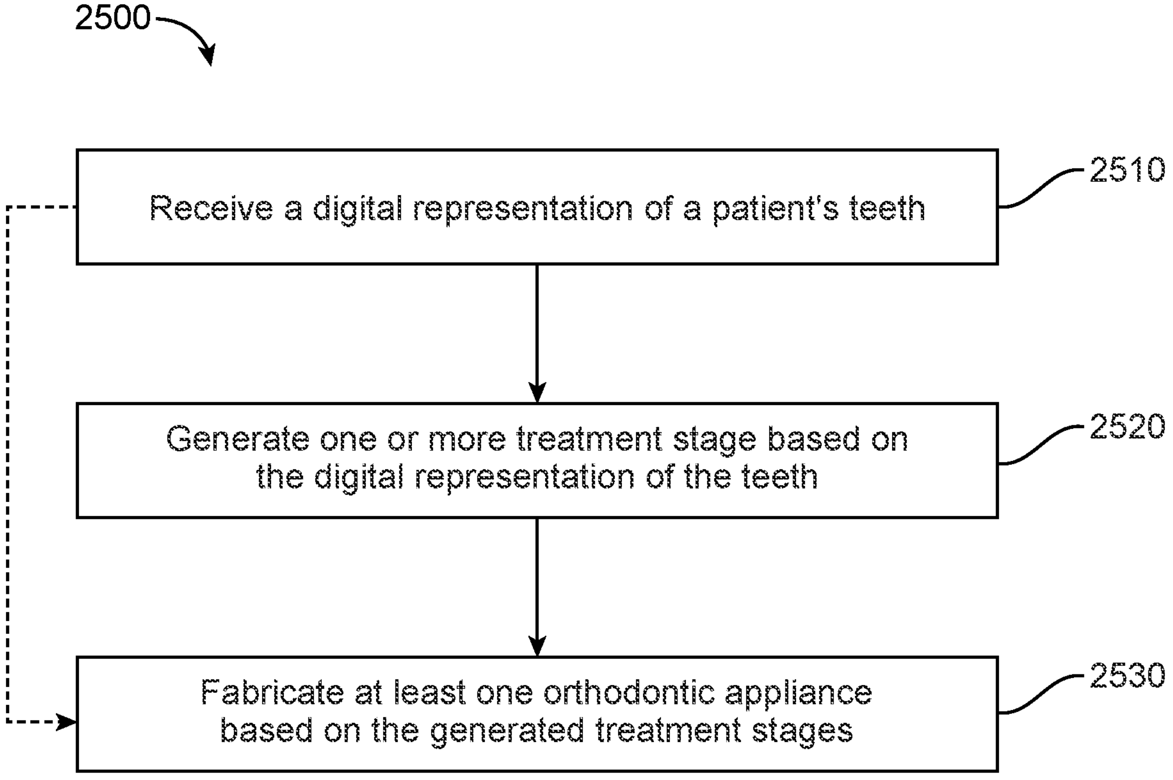
FIG. 25 shows a method for digitally planning an orthodontic treatment, in accordance with embodiments.

FIG. 25 illustrates a method 2500 for digitally planning an orthodontic treatment and/or design or fabrication of an appliance, in accordance with many embodiments. The method 1000 can be applied to any of the treatment procedures described herein and can be performed by any suitable data processing system. Any embodiment of the appliances described herein can be designed or fabricated using the method 2500.

In step 2510, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 2520, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 2530, at least one orthodontic appliance is fabricated based on the generated treatment stages. For example, a set of appliances can be fabricated to be sequentially worn by the patient to incrementally reposition the teeth from the initial arrangement to the target arrangement. Some of the appliances can be shaped to accommodate a tooth arrangement specified by one of the treatment stages. Alternatively or in combination, some of the appliances can be shaped to accommodate a tooth arrangement that is different from the target arrangement for the corresponding treatment stage. For example, as previously described herein, an appliance may have a geometry corresponding to an overcorrected tooth arrangement. Such an appliance may be used to ensure that a suitable amount of force is expressed on the teeth as they approach or attain their desired target positions for the treatment stage. As another example, an appliance can be designed in order to apply a specified force system on the teeth and may not have a geometry corresponding to any current or planned arrangement of the patient's teeth.

In some instances, staging of various arrangements or treatment stages may not be necessary for design and/or fabrication of an appliance. As illustrated by the dashed line in FIG. 25, design and/or fabrication of an orthodontic appliance, and perhaps a particular orthodontic treatment, may include use of a representation of the patient's teeth (e.g., receive a digital representation of the patient's teeth 2510), followed by design and/or fabrication of an orthodontic appliance based on a representation of the patient's teeth in the arrangement represented by the received representation.

Figure 26:
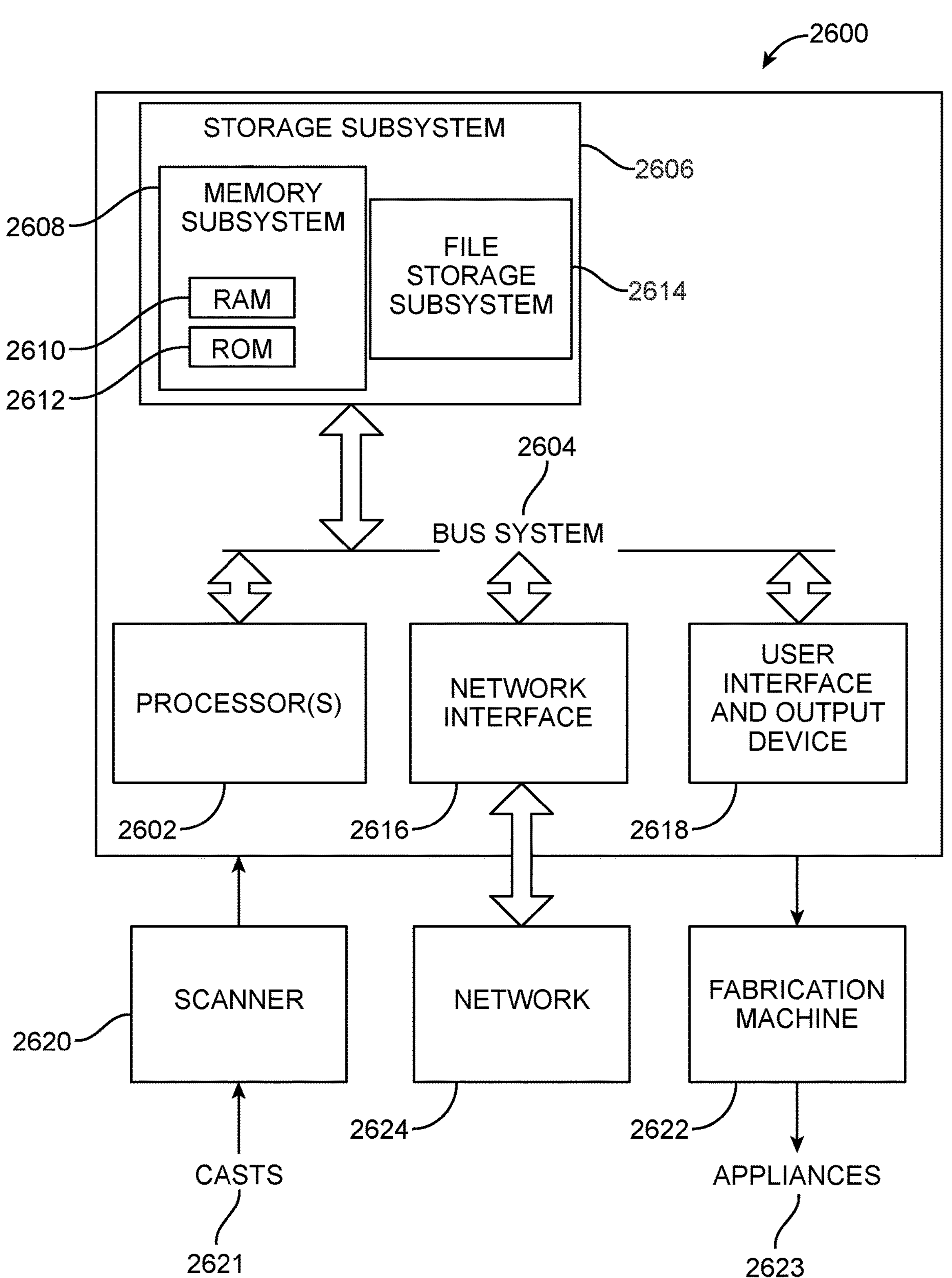
FIG. 26 shows a simplified block diagram of a data processing system, in accordance with embodiments.

FIG. 26 is a simplified block diagram of a data processing system 2600 that may be used in executing methods and processes described herein. The data processing system 2600 typically includes at least one processor 2602 that communicates with one or more peripheral devices via bus subsystem 2604. These peripheral devices typically include a storage subsystem 2606 (memory subsystem 2608 and file storage subsystem 2614), a set of user interface input and output devices 2618, and an interface to outside networks 2616. This interface is shown schematically as "Network Interface" block 2616, and is coupled to corresponding interface devices in other data processing systems via communication network interface 2624. Data processing system 2600 can include, for example, one or more computers, such as a personal computer, workstation, mainframe, laptop, and the like.

The user interface input devices 2618 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 2606 maintains the basic required programming, including computer readable media having instructions (e.g., operating instructions, etc.), and data constructs. The program modules discussed herein are typically stored in storage subsystem 2606. Storage subsystem 2606 typically includes memory subsystem 2608 and file storage subsystem 2614. Memory subsystem 2608 typically includes a number of memories (e.g., RAM 2610, ROM 2612, etc.) including computer readable memory for storage of fixed instructions, instructions and data during program execution, basic input/output system, etc. File storage subsystem 2614 provides persistent (non-volatile) storage for program and data files, and can include one or more removable or fixed drives or media, hard disk, floppy disk, CD-ROM, DVD, optical drives, and the like. One or more of the storage systems, drives, etc. may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 2620 includes any means for obtaining a digital representation (e.g., images, surface topography data, etc.) of a patient's teeth (e.g., by scanning physical models of the teeth such as casts 2621, by scanning impressions taken of the teeth, or by directly scanning the intraoral cavity), which can be obtained either from the patient or from treating professional, such as an orthodontist, and includes means of providing the digital representation to data processing system 2600 for further processing. Scanner 2620 may be located at a location remote with respect to other components of the system and can communicate image data and/or information to data processing system 2600, for example, via a network interface 2624. Fabrication system 2622 fabricates appliances 2623 based on a treatment plan, including data set information received from data processing system 2600. Fabrication machine 2622 can, for example, be located at a remote location and receive data set information from data processing system 2600 via network interface 2624.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of" Finally, for ease of use, the terms "including" and "having" (and their derivatives), as used in the specification and claims, are interchangeable with and shall have the same meaning as the word "comprising."

The processor as disclosed herein can be configured with instructions to perform any one or more steps of any method as disclosed herein.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, the term "or" is used inclusively to refer items in the alternative and in combination.

As used herein, characters such as numerals refer to like elements.

The present disclosure includes the following numbered clauses.

Clause 1. A system for generating an orthodontic appliance with mandibular relocations structures, the system comprising: one or more processors; and a non-transitory computer readable medium comprising instructions that when executed by the one or more processors cause the system to carry out a method comprising: generating a treatment plan to move a patient's teeth from a first position toward a second position and including moving a jaw from a first position towards a second position, the treatment plan including a series of jaw movement stages to move the jaw from the first position towards the second position; placing a first mandibular relocation structure of a first pair of mandibular relocation structures on a lower jaw and a second mandibular relocation structure of the first pair of mandibular relocation structures on an upper jaw; determining a location of the first pair of mandibular relocation structures based on a first set of constraints; placing a first mandibular relocation structure of a second pair of mandibular relocation structures on a lower jaw and a second mandibular relocation structure of the second pair of mandibular relocation structures on an upper jaw; determining a location of the second pair of mandibular relocation structures based on a second set of constraints; determining the location of the first and second pair of mandibular relocation structures based on a third set of constraints; and providing the location of the first and second pair of mandibular relocation structures to implement the series of jaw movement stages.

Clause 2. The system of clause 1, wherein the method further comprising: generating a digital model of an aligner; and fabricating a physical aligner based on the digital model of the aligner.

Clause 3. The system of clause 1, wherein determining a location of the first pair of mandibular relocation structures based on a first set of constraints includes optimizing the location based on the first set of constraints.

Clause 4. The system of clause 1, wherein determining a location of the first pair of mandibular relocation structures based on a first set of constraints includes using a non-linear optimization algorithm.

Clause 5. The system of clause 1, wherein the first set of constraints and the second set of constraints include one-sided constraints for a respective one of the first pair of mandibular relocation structures and the second pair of mandibular relocation structures.

Clause 6. The system of clause 1, wherein the third set of constraints include symmetry constraints.

Clause 7. The system of clause 1, wherein the third set of constraints include one-sided and symmetry constraints.

Clause 8. The system of clause 5, wherein the one-sided constraints include a collision constraint that tests for a collisions between a first mandibular relocation structure on a first side of a first jaw and a second mandibular relocation feature on the first side of a second jaw.

Clause 9. The system of clause 5, wherein the one-sided constraints include rotational constraints that constrains the rotation of the mandibular relocation structures relative to an arch of the patient.

Clause 10. The system of clause 5, wherein the one-sided constraints include rotational alignment constraints between a first mandibular relocation structure on a first side of a first jaw and a second mandibular relocation feature on the first side of a second jaw.

Clause 11. The system of clause 5, wherein the one-sided constraints include contact plane constraints including a constraint on an angle between a normal angle of a centroid of an engagement surface of a first mandibular relocation structure on a first side of a first jaw and a normal angle of a centroid of an engagement surface of a second mandibular relocation feature on the first side of a second jaw.

Clause 12. The system of clause 5, wherein the one-sided constraints include a later constraint on the distance between a center of a first mandibular relocation structure and a line extending between centers of two adjacent tooth over which the first mandibular relocation structure is located.

Clause 13. The system of clause 5, wherein the one-sided constraints include a constraint on a gap between an occlusal block and the teeth over which the first mandibular relocation structure is located, the gap being the shortest distance an occlusal bock of the first mandibular relocation structure and an occlusal surface of the teeth over which the first mandibular relocation structure is located.

Clause 14. The system of clause 5, wherein the one-sided constraints include a constraint on a distal arch location of the first mandibular relocation structure, the distal arch location being greater than a threshold distance from a distal most point of a distal most tooth on the same side of the arch on which the first mandibular relocation structure is located.

Clause 15. The system of clause 5, wherein the one-sided constraints include a constraint on arch location of the first mandibular relocation structure, the arch location being greater than a threshold distance from a distal most point of a distal most tooth on the same side of the arch on which the first mandibular relocation structure is located and greater than 5 mm from a mesial most point of a mesial most tooth on the same side of the arch on which the first mandibular relocation structure is located.

Clause 16. The system of clause 5, wherein the one-sided constraints include a constraint on vertical engagement, the constraint being a distance between a vertically occlusal location on an engagement surface of a first mandibular relocation structure and a vertically occlusal location on an engagement surface of a second mandibular relocation structure.

Clause 17. The system of clause 5, wherein the one-sided constraints include a constraint on lateral engagement including a constraint on a distance from a lingual side of a first block to buccal side of second block.

Clause 18. The system of clause 6, wherein the symmetry constraints include a vertical asymmetry constraint based on a difference between a distance between a first mandibular relocation structure and opposing teeth on a first side of a jaw and a distance between a second mandibular relocation structure and opposing teeth on a second side of the jaw.

Clause 19. The system of clause 6, wherein the symmetry constraints include a horizontal asymmetry constraint between a center of a first pair of mandibular relocation structures on a first side of an arch and a center of a second pair of mandibular relocation structures on a second side of the arch.

Clause 20. The system of clause 5, wherein the one-sided constraints include a bridging constraint, the bridging constraint being a constraint on a distance a mandibular relocation structure extends over a supporting tooth adjacent a gap formed by an erupting or missing tooth.

Clause 21. The system of clause 1, wherein the method further comprises adjusting a jaw opening distance between the upper jaw and the lower jaw.

Clause 22. The system of clause 1, wherein: placing a first mandibular relocation structure of a first pair of mandibular relocation structures on a lower jaw and a second mandibular relocation structure of the first pair of mandibular relocation structures on an upper jaw occur before determining the location of the first pair of mandibular relocation structures based on a first set of constraints, determining a location of the second pair of mandibular relocation structures based on a second set of constraints, and determining the location of the first and second pair of mandibular relocation structures based on a third set of constraints.

Clause 23. A method of treating malocclusions of teeth, the method comprising: generating a treatment plan to move a patient's teeth from a first position toward a second position and including moving a jaw from a first position towards a second position, the treatment plan including a series of jaw movement stages to move the jaw from the first position towards the second position; placing a first mandibular relocation structure of a first pair of mandibular relocation structures on a lower jaw and a second mandibular relocation structure of the first pair of mandibular relocation structures on an upper jaw; determining a location of the first pair of mandibular relocation structures based on a first set of constraints; placing a first mandibular relocation structure of a second pair of mandibular relocation structures on a lower jaw and a second mandibular relocation structure of the second pair of mandibular relocation structures on an upper jaw; determining a location of the second pair of mandibular relocation structures based on a second set of constraints; determining the location of the first and second pair of mandibular relocation structures based on a third set of constraints; and providing the location of the first and second pair of mandibular relocation structures to implement the series of jaw movement stages.

Clause 24. The method of clause 22, wherein the method further comprises: generating a digital model of an aligner; and fabricating a physical aligner based on the digital model of the aligner.

Clause 25. The method of clause 22, wherein determining a location of the first pair of mandibular relocation structures based on a first set of constraints includes optimizing the location based on the first set of constraints.

Clause 26. The method of clause 22, wherein determining a location of the first pair of mandibular relocation structures based on a first set of constraints includes using a non-linear optimization algorithm.

Clause 27. The method of clause 22, wherein the first set of constraints and the second set of constraints include one-sided constraints for a respective one of the first pair of mandibular relocation structures and the second pair of mandibular relocation structures.

Clause 28. The method of clause 22, wherein the third set of constraints include symmetry constraints.

Clause 29. The method of clause 22, wherein the third set of constraints include one-sided and symmetry constraints.

Clause 30. The method of clause 25, wherein the one-sided constraints include a collision constraint that tests for a collisions between a first mandibular relocation structure on a first side of a first jaw and a second mandibular relocation feature on the first side of a second jaw.

Clause 31. The method of clause 25, wherein the one-sided constraints include rotational constraints that constrains the rotation of the mandibular relocation structures relative to an arch of the patient.

Clause 32. The method of clause 25, wherein the one-sided constraints include rotational alignment constraints between a first mandibular relocation structure on a first side of a first jaw and a second mandibular relocation feature on the first side of a second jaw.

Clause 33. The method of clause 25, wherein the one-sided constraints include contact plane constraints including a constraint on an angle between a normal angle of a centroid of an engagement surface of a first mandibular relocation structure on a first side of a first jaw and a normal angle of a centroid of an engagement surface of a second mandibular relocation feature on the first side of a second jaw.

Clause 34. The method of clause 25, wherein the one-sided constraints include a later constraint on the distance between a center of a first mandibular relocation structure and a line extending between centers of two adjacent tooth over which the first mandibular relocation structure is located.

Clause 35. The method of clause 25, wherein the one-sided constraints include a constraint on a gap between an occlusal block and the teeth over which the first mandibular relocation structure is located, the gap being the shortest distance an occlusal bock of the first mandibular relocation structure and an occlusal surface of the teeth over which the first mandibular relocation structure is located.

Clause 36. The method of clause 25, wherein the one-sided constraints include a constraint on a distal arch location of the first mandibular relocation structure, the distal arch location being greater than a threshold distance from a distal most point of a distal most tooth on the same side of the arch on which the first mandibular relocation structure is located.

Clause 37. The method of clause 25, wherein the one-sided constraints include a constraint on arch location of the first mandibular relocation structure, the arch location being greater than a threshold distance from a distal most point of a distal most tooth on the same side of the arch on which the first mandibular relocation structure is located and greater than 5 mm from a mesial most point of a mesial most tooth on the same side of the arch on which the first mandibular relocation structure is located.

Clause 38. The method of clause 25, wherein the one-sided constraints include a constraint on vertical engagement, the constraint being a distance between a vertically occlusal location on an engagement surface of a first mandibular relocation structure and a vertically occlusal location on an engagement surface of a second mandibular relocation structure.

Clause 39. The method of clause 25, wherein the one-sided constraints include a constraint on lateral engagement including a constraint on a distance from a lingual side of a first block to buccal side of second block.

Clause 40. The method of clause 26, wherein the symmetry constraints include a vertical asymmetry constraint based on a difference between a distance between a first mandibular relocation structure and opposing teeth on a first side of a jaw and a distance between a second mandibular relocation structure and opposing teeth on a second side of the jaw.

Clause 41. The method of clause 26, wherein the symmetry constraints include a horizontal asymmetry constraint between a center of a first pair of mandibular relocation structures on a first side of an arch and a center of a second pair of mandibular relocation structures on a second side of the arch.

Clause 42. The method of clause 25, wherein the one-sided constraints include a bridging constraint, the bridging constraint being a constraint on a distance a mandibular relocation structure extends over a supporting tooth adjacent a gap formed by an erupting or missing tooth.

Clause 43. The method of clause 22, wherein: placing a first mandibular relocation structure of a first pair of mandibular relocation structures on a lower jaw and a second mandibular relocation structure of the first pair of mandibular relocation structures on an upper jaw occur before determining the location of the first pair of mandibular relocation structures based on a first set of constraints, determining a location of the second pair of mandibular relocation structures based on a second set of constraints, and determining the location of the first and second pair of mandibular relocation structures based on a third set of constraints.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A system for generating an orthodontic appliance with mandibular relocations structures, the system comprising:

one or more processors; and a non-transitory computer readable medium comprising instructions that when executed by the one or more processors cause the system to carry out a method comprising:

generating a treatment plan to move a patient's teeth from a first position toward a second position and including moving a jaw from a first position towards a second position, the treatment plan including a series of jaw movement stages to move the jaw from the first position towards the second position;

iteratively, for a first stage of a treatment plan:

placing, for a first stage of a treatment plan, a first mandibular relocation structure of a first pair of mandibular relocation structures on a lower jaw and a second mandibular relocation structure of the first pair of mandibular relocation structures on an upper jaw;

determining, for the first stage of a treatment plan, a location for the first pair of mandibular relocation structures based on a first set of constraints;

placing, for the first stage of a treatment plan, a first mandibular relocation structure of a second pair of mandibular relocation structures on a lower jaw and a second mandibular relocation structure of the second pair of mandibular relocation structures on an upper jaw;

determining, for the first stage of the treatment plan, a location for the second pair of mandibular relocation structures based on a second set of constraints; and modifying the respective locations of the first and second pair of mandibular relocation structures for the first stage of the treatment plan based on a third set of constraints, wherein the third set of constraints includes a symmetry constraint based on a difference between a first distance and a second distance, the first distance being between a first mandibular relocation structure and opposing teeth on a first side of a jaw and the second distance between a second mandibular relocation structure and opposing teeth on a second side of the jaw; and providing the modified location of the first and second pair of mandibular relocation structures for the first stage of the treatment plan to implement the series of jaw movement stages.

2. The system of claim 1, wherein the method further comprising:

generating a digital model of an aligner; and fabricating a physical aligner based on the digital model of the aligner.

3. The system of claim 1, wherein determining a location of the first pair of mandibular relocation structures based on a first set of constraints includes optimizing the location based on the first set of constraints.

4. The system of claim 1, wherein determining a location of the first pair of mandibular relocation structures based on a first set of constraints includes using a non-linear optimization algorithm.

5. The system of claim 1, wherein the first set of constraints and the second set of constraints include one-sided constraints for a respective one of the first pair of mandibular relocation structures and the second pair of mandibular relocation structures.

6. The system of claim 1, wherein the third set of constraints include one-sided and symmetry constraints.

7. The system of claim 5, wherein the one-sided constraints include a collision constraint that tests for a collision between a first mandibular relocation structure on a first side of a first jaw and a second mandibular relocation feature on the first side of a second jaw.

8. The system of claim 5, wherein the one-sided constraints include rotational constraints that constrain the rotation of the mandibular relocation structures relative to an arch of the patient.

9. The system of claim 5, wherein the one-sided constraints include rotational alignment constraints between a first mandibular relocation structure on a first side of a first jaw and a second mandibular relocation feature on the first side of a second jaw.

10. The system of claim 5, wherein the one-sided constraints include contact plane constraints including a constraint on an angle between a normal angle of a centroid of an engagement surface of a first mandibular relocation structure on a first side of a first jaw and a normal angle of a centroid of an engagement surface of a second mandibular relocation feature on the first side of a second jaw.

11. The system of claim 5, wherein the one-sided constraints include a later constraint on the distance between a center of a first mandibular relocation structure and a line extending between centers of two adjacent tooth over which the first mandibular relocation structure is located.

12. The system of claim 5, wherein the one-sided constraints include a constraint on a gap between an occlusal block and the teeth over which the first mandibular relocation structure is located, the gap being the shortest distance an occlusal bock of the first mandibular relocation structure and an occlusal surface of the teeth over which the first mandibular relocation structure is located.

13. The system of claim 5, wherein the one-sided constraints include a constraint on a distal arch location of the first mandibular relocation structure, the distal arch location being greater than a threshold distance from a distal most point of a distal most tooth on the same side of the arch on which the first mandibular relocation structure is located.

14. The system of claim 5, wherein the one-sided constraints include a constraint on arch location of the first mandibular relocation structure, the arch location being greater than a threshold distance from a distal most point of a distal most tooth on the same side of the arch on which the first mandibular relocation structure is located and greater than 5 mm from a mesial most point of a mesial most tooth on the same side of the arch on which the first mandibular relocation structure is located.

15. The system of claim 5, wherein the one-sided constraints include a constraint on vertical engagement, the constraint being a distance between a vertically occlusal location on an engagement surface of a first mandibular relocation structure and a vertically occlusal location on an engagement surface of a second mandibular relocation structure.

16. The system of claim 5, wherein the one-sided constraints include a constraint on lateral engagement including a constraint on a distance from a lingual side of a first block to buccal side of second block.

17. The system of claim 1, wherein the symmetry constraints include a horizontal asymmetry constraint between a center of a first pair of mandibular relocation structures on a first side of an arch and a center of a second pair of mandibular relocation structures on a second side of the arch.

18. The system of claim 5, wherein the one-sided constraints include a bridging constraint, the bridging constraint being a constraint on a distance a mandibular relocation structure extends over a supporting tooth adjacent a gap formed by an erupting or missing tooth.

19. The system of claim 1, wherein the method further comprising adjusting a jaw opening distance between the upper jaw and the lower jaw.

20. The system of claim 1, wherein:

placing a first mandibular relocation structure of a first pair of mandibular relocation structures on a lower jaw and a second mandibular relocation structure of the first pair of mandibular relocation structures on an upper jaw occur before determining the location of the first pair of mandibular relocation structures based on a first set of constraints, determining a location of the second pair of mandibular relocation structures based on a second set of constraints, and determining the location of the first and second pair of mandibular relocation structures based on a third set of constraints.

* * * * *